US010750434B2

(12) United States Patent
Ng et al.

(10) Patent No.: US 10,750,434 B2
(45) Date of Patent: *Aug. 18, 2020

(54) QUASI CO-LOCATION IDENTIFICATION OF REFERENCE SYMBOL PORTS FOR COORDINATED MULTI-POINT COMMUNICATION SYSTEMS

(71) Applicant: Samsung Electronics Co., Ltd., Suwon-si, Gyeonggi-do (KR)

(72) Inventors: Boon Loong Ng, Dallas, TX (US); Krishna Sayana, San Jose, CA (US); Young-Han Nam, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,480

(22) Filed: Oct. 17, 2019

(65) Prior Publication Data

US 2020/0053633 A1  Feb. 13, 2020

Related U.S. Application Data

(63) Continuation of application No. 16/140,237, filed on Sep. 24, 2018, which is a continuation of application
(Continued)

(51) Int. Cl.
*H04W 48/12* (2009.01)
*H04W 64/00* (2009.01)
(Continued)

(52) U.S. Cl.
CPC ........... *H04W 48/12* (2013.01); *H04L 5/0092* (2013.01); *H04L 25/0202* (2013.01);
(Continued)

(58) Field of Classification Search
CPC ..... H04W 48/16; H04W 16/14; H04W 48/12; H04W 56/00; H04W 64/008;
(Continued)

(56) References Cited

U.S. PATENT DOCUMENTS 8,599,708 B2 * 12/2013 Chen .................... H04L 1/0028
370/252
8,724,498 B2 * 5/2014 Choi .................... H04L 5/0092
370/241
(Continued)

FOREIGN PATENT DOCUMENTS

KR  10-2011-0030372 A  3/2011
KR  10-2011-0132180 A  12/2011

OTHER PUBLICATIONS

Decision of Patent dated Nov. 21, 2019 in connection with Korean Patent Application No. 10-2014-7025779, 8 pages.

*Primary Examiner* — Man U Phan

(57) ABSTRACT

Methods and apparatuses indicate and identify quasi co-located reference signal ports. A method of identifying by a UE includes identifying, from downlink control information, a CSI-RS port that is quasi co-located with a DM-RS port assigned to the UE. The method includes identifying large scale properties for the assigned DM-RS port based on large scale properties for the CSI-RS port. The method includes performing channel estimation and/or time/frequency synchronization using the identified large scale properties for the DM-RS port. Another method for identifying by a UE includes identifying, from downlink control information, a CRS port that is quasi co-located with a CSI-RS port configured for the UE. The method includes identifying large scale properties for the configured CSI-RS port based on large scale properties for the CRS port. The method includes performing channel estimation and/or time/
(Continued)

frequency synchronization using the identified large scale properties for the CSI-RS port.

16 Claims, 5 Drawing Sheets

Related U.S. Application Data

No. 13/866,804, filed on Apr. 19, 2013, now Pat. No. 10,085,202.

(60) Provisional application No. 61/635,742, filed on Apr. 19, 2012, provisional application No. 61/650,300, filed on May 22, 2012, provisional application No. 61/678,994, filed on Aug. 2, 2012, provisional application No. 61/680,146, filed on Aug. 6, 2012, provisional application No. 61/699,066, filed on Sep. 10, 2012.

(51) Int. Cl.
*H04L 25/02* (2006.01)
*H04L 5/00* (2006.01)
*H04L 27/26* (2006.01)
*H04W 16/14* (2009.01)
*H04W 48/16* (2009.01)
*H04W 56/00* (2009.01)

(52) U.S. Cl.
CPC ...... *H04L 25/0224* (2013.01); *H04L 27/2655* (2013.01); *H04L 27/2665* (2013.01); *H04W 16/14* (2013.01); *H04W 48/16* (2013.01); *H04W 64/003* (2013.01); *H04L 5/0035* (2013.01); *H04L 5/0048* (2013.01); *H04W 56/00* (2013.01)

(58) Field of Classification Search
CPC .............. H04W 64/00; H04L 25/0202; H04L 25/0224; H04L 5/0035; H04L 5/0048; H04L 5/0092; H04L 27/2655; H04L 27/2665; H04L 27/26; H04L 5/00; H04L 25/02
USPC ......................................................... 370/329
See application file for complete search history.

(56) References Cited

U.S. PATENT DOCUMENTS

| | | | |
|---|---|---|---|
| 8,767,646 B2* | 7/2014 | Han | H04B 7/0689 370/329 |
| 8,787,216 B2 | 7/2014 | Yoon et al. | |
| 8,953,642 B2 | 2/2015 | Noh et al. | |
| 8,995,347 B2* | 3/2015 | Nam | H04W 48/12 370/328 |
| 9,119,209 B2* | 8/2015 | Nam | H04B 7/0469 |
| 9,136,997 B2* | 9/2015 | Gaal | H04L 5/0048 |
| 9,160,426 B2* | 10/2015 | Ko | H04B 7/024 |
| 9,179,349 B2* | 11/2015 | Nagata | H04W 24/10 |
| 9,210,592 B2* | 12/2015 | Davydov | H04B 7/0689 |
| 2012/0122472 A1* | 5/2012 | Krishnamurthy | H04L 5/0053 455/456.1 |
| 2012/0207043 A1* | 8/2012 | Geirhofer | H04L 5/0048 370/252 |
| 2014/0016496 A1* | 1/2014 | Su | H04B 7/0626 370/252 |
| 2015/0249511 A1* | 9/2015 | Chen | H04L 1/0026 370/252 |

* cited by examiner

QUASI CO-LOCATION IDENTIFICATION OF REFERENCE SYMBOL PORTS FOR COORDINATED MULTI-POINT COMMUNICATION SYSTEMS

CROSS-REFERENCE TO RELATED APPLICATION(S) AND CLAIM OF PRIORITY

This application is a continuation of U.S. Non-Provisional patent application Ser. No. 16/140,237 filed on Sep. 24, 2018 and entitled QUASI CO-LOCATION IDENTIFICATION OF REFERENCE SYMBOL PORTS FOR COORDINATED MULTI-POINT COMMUNICATION SYSTEMS, which is a continuation of U.S. Non-Provisional patent application Ser. No. 13/866,804 filed Apr. 19, 2013 and entitled QUASI CO-LOCATION IDENTIFICATION OF REFERENCE SYMBOL PORTS FOR COORDINATED MULTI-POINT COMMUNICATION SYSTEMS, now U.S. Pat. No. 10,085,202, and claims priority to U.S. Provisional Patent Application No. 61/635,742 filed Apr. 19, 2012 and entitled METHODS AND APPARATUS TO DETERMINE QUASI CO-LOCATION OF RS PORTS AND DOWNLINK TIMING REFERENCE FOR CoMP; U.S. Provisional Patent Application No. 61/650,300 filed May 22, 2012 and entitled METHODS AND APPARATUS TO DETERMINE QUASI CO-LOCATION OF RS PORTS AND DOWNLINK TIMING REFERENCE FOR CoMP; U.S. Provisional Patent Application No. 61/678,994 filed Aug. 2, 2012 and entitled METHODS AND APPARATUS TO DETERMINE QUASI CO-LOCATION OF RS PORTS FOR CoMP; U.S. Provisional Patent Application No. 61/680,146 filed Aug. 6, 2012 and entitled METHODS AND APPARATUS TO DETERMINE QUASI CO-LOCATION OF RS PORTS FOR CoMP; and U.S. Provisional Patent Application No. 61/699,066 filed Sep. 10, 2012 and entitled METHODS AND APPARATUS TO DETERMINE QUASI CO-LOCATION OF RS PORTS FOR COMP. The content of the above-identified patent documents is incorporated herein by reference.

TECHNICAL FIELD

The present application relates generally to coordinated multi-point (CoMP) communication systems and, more specifically, to identification of reference symbol ports that may be considered as quasi co-located.

BACKGROUND

CoMP technology has been standardized to allow the user equipment (UE) to receive signals from multiple transmission points (TPs) in different usage scenarios. The different scenarios include: 1) a homogeneous network with intra-site CoMP, 2) a homogeneous network with high transmit (Tx) power remote radio heads (RRHs), 3) a heterogeneous network with low-power RRHs within the macro cell coverage where the transmission/reception points created by the RRHs have different cell identifiers (IDs) from the macro cell, and 4) a heterogeneous network with low power RRHs within the macro cell coverage where the transmission/reception points created by the RRHs have the same cell IDs as the macro cell. The CoMP communication schemes that have been identified as the focus for standardization are joint transmission (JT); dynamic point selection (DPS), including dynamic point blanking; and coordinated scheduling/beamforming, including dynamic point blanking. Further description of the CoMP usage scenarios is included in 3GPP TS 36.819, which is expressly incorporated by reference herein.

Accordingly, there is a need for improved techniques in the CoMP communication schemes.

SUMMARY

Embodiments of the present disclosure provide methods and apparatuses to indicate and identify quasi co-located reference signal ports in a wireless communication system.

In one embodiment, a method for identifying quasi co-located reference signal ports by a user equipment (UE) is provided. The method includes receiving downlink control information. The method includes identifying, from the downlink control information, a channel state information reference signal (CSI-RS) port that is quasi co-located with a demodulation reference signal (DM-RS) port assigned to the UE. The method includes identifying large scale properties for the assigned DM-RS port based on large scale properties for the CSI-RS port. Additionally, the method includes performing at least one of channel estimation, time synchronization, or frequency synchronization using the large scale properties for the assigned DM-RS port and the CSI-RS port.

In another embodiment, a method for indicating quasi co-located reference signal ports by a network entity is provided. The method includes providing, in downlink control information for a UE, an indication of a CSI-RS port that is quasi co-located with a DM-RS port assigned to the UE for the UE to identify large scale properties for the assigned DM-RS port based on large scale properties for the CSI-RS port to perform at least one of channel estimation, time synchronization, or frequency synchronization using the identified large scale properties for the assigned DM-RS port and the CSI-RS port.

In yet another embodiment, an apparatus in a UE configured to identify quasi co-located reference signal ports is provided. The apparatus includes a receiver configured to receive downlink control information and a controller. The controller is configured to identify, from the downlink control information, a CSI-RS port that is quasi co-located with a DM-RS port assigned to the UE. The controller is configured to identify large scale properties for the assigned DM-RS port based on large scale properties for the CSI-RS port. Additionally, the controller is configured to perform at least one of channel estimation, time synchronization, or frequency synchronization using the large scale properties for the assigned DM-RS port and the CSI-RS port.

In another embodiment, an apparatus in a network entity configured to indicate quasi co-located reference signal ports is provided. The apparatus includes a transmitter configured to provide, in downlink control information for a UE an indication of a CSI-RS port that is quasi co-located with a DM-RS port assigned to the UE for the UE to identify large scale properties for the assigned DM-RS port based on large scale properties for the CSI-RS port to perform at least one of channel estimation, time synchronization, or frequency synchronization using the identified large scale properties for the assigned DM-RS port and the CSI-RS port.

In yet another embodiment, a method for identifying quasi co-located reference signal ports by a UE is provided. The method includes receiving downlink control information. The method includes identifying, from the downlink control information, a cell-specific reference signal (CRS) port that is quasi co-located with a CSI-RS port configured for the UE. The method includes identifying large scale properties for the configured CSI-RS port based on large scale properties for the CRS port. Additionally, the method includes performing at least one of channel estimation, time synchronization, or frequency synchronization using the identified large scale properties for the CSI-RS port.

In another embodiment, a method for indicating quasi co-located reference signal ports by a network entity is provided. The method includes providing, in downlink control information for a UE, an indication of a CRS port that is quasi co-located with a CSI-RS port configured for the UE for the UE to identify large scale properties for the configured CSI-RS port based on large scale properties for the CRS port to perform at least one of channel estimation, time synchronization, or frequency synchronization using the identified large scale properties for the CSI-RS port.

In yet another embodiment, an apparatus in a UE configured to identify quasi co-located reference signal ports is provided. The apparatus includes a receiver configured to receive downlink control information and a controller. The controller is configured to identify, from the downlink control information, a CRS port that is quasi co-located with a CSI-RS port configured for the UE. The controller is configured to identify large scale properties for the configured CSI-RS port based on large scale properties for the CRS port. The controller is configured to perform at least one of channel estimation, time synchronization, or frequency synchronization using the identified large scale properties for the CSI-RS port.

In another embodiment, an apparatus in a network entity configured to indicate quasi co-located reference signal ports is provided. The apparatus includes a transmitter configured to provide, in downlink control information for a UE, an indication of a CRS port that is quasi co-located with a CSI-RS port configured for the UE for the UE to identify large scale properties for the configured CSI-RS port based on large scale properties for the CRS port to perform at least one of channel estimation, time synchronization, or frequency synchronization using the identified large scale properties for the CSI-RS port.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
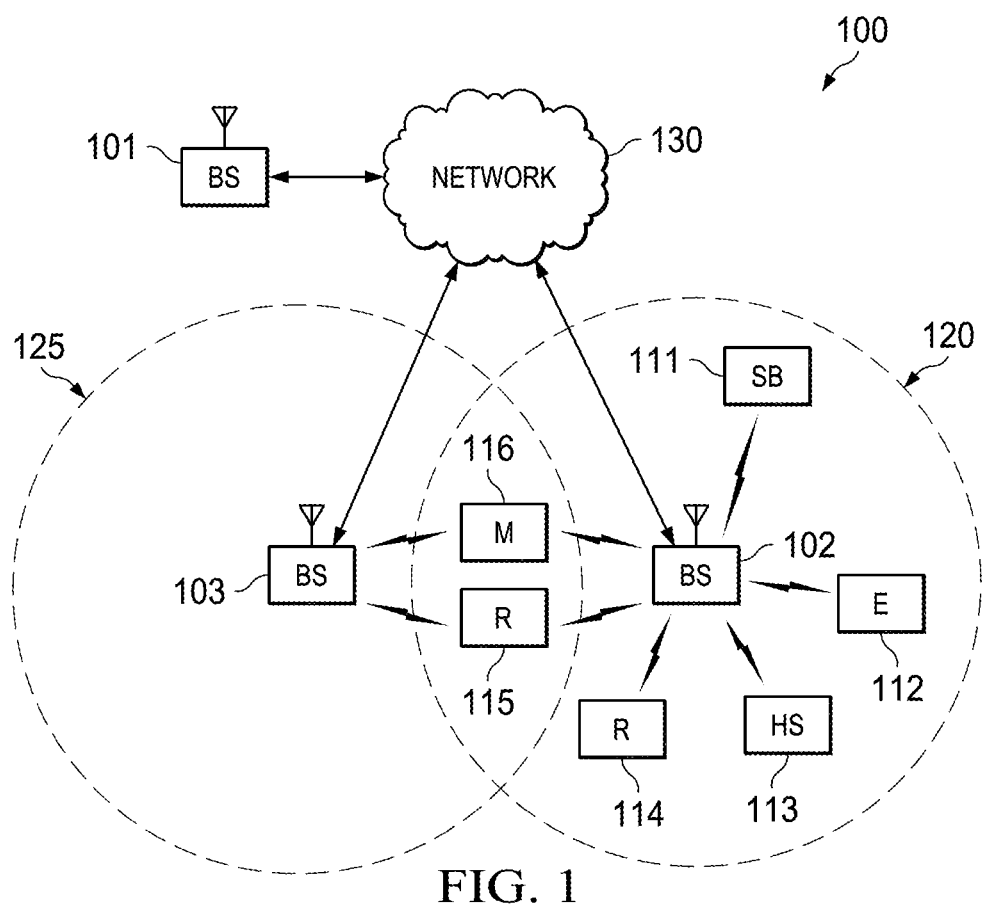
FIG. 1 illustrates an exemplary wireless system which transmits messages in accordance with an illustrative embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standard descriptions are hereby incorporated into the present disclosure as if fully set forth herein: 3GPP TS 36.133 V10.3.0 (2011 June); RP-111365 "Coordinated Multi-Point Operation for LTE WID"; 3GPP TR 36.819 V11.0.0 (2011 September); R1-121026 "Discussion on Antenna Ports Co-location," by Ericsson, ST-Ericsson. The present application also incorporates by reference U.S. patent application Ser. No. 13/626,572, filed Sep. 25, 2012 and entitled "Downlink Timing Reference for Coordinated Multipoint Communication."

Standards for CoMP communication include enhancement to DMRS sequence supported in release 11 for DL-CoMP. The scrambling sequence of DMRS for PDSCH on ports 7~14 is initialized according to equation 1 below:

$$c_{init}=(\lfloor n_s/2 \rfloor+1)\cdot(2X+1)\cdot 2^{16}+n_{SCID} \quad (1)$$

where X is a parameter whose value is dynamically chosen from $\{x(0), x(1), \ldots x(N-1)\}$ for $N>1$, and $x(n)$ ($0<=n<N$) are configured by UE-specific radio resource control (RRC) signaling, where $N=2$, X is jointly indicated with the scrambling identity ($n_{SCID}$) only for rank 1 and 2 in DCI format 2D (nSCID equals to 0 for the rank larger than 2). The scrambling sequence itself can be generated according to 3GPP TS 36.211 § 6.10.3.1, which is expressly incorporated by reference herein.

The configuration of multiple non-zero power CSI-RS resources includes at least information elements (3GPP TS 36.331, which is expressly incorporated by reference herein): AntennaPortsCount, ResourceConfig, SubframeConfig, and the parameter X to derive scrambling initialization (X ranges from 0 to 503, can be interpreted as virtual cell ID, and in release 10 of 3GPP is the PCI of the serving cell). The scrambling sequence of CSI-RS is initialized according to equation 2 below:

$$c_{init}=2^{10}\cdot(7\cdot(n_s+1)+l+1)\cdot(2\cdot X+1)+2\cdot X+N_{CP} \qquad (2)$$

These parameters are configured per CSI-RS resource. The scrambling sequence itself can be generated according to 3GPP TS 36.211 § 6.10.5.1, which is expressly incorporated by reference herein. Further study has been proposed as to whether some parameters can be configured per CSI-RS port considering the decision of supporting coherent joint transmission by the aggregated CSI feedback corresponding to multiple TPs in one CSI-RS resource; UE-specific RRC signaling for CSI-RS restriction is configurable per CSI-RS resource; and signaling of the bandwidth information for CSI-RS.

A CSI-RS resource can also be configured with an identifier (ID) which is unique within a set of CSI-RS resources configured to the UE, referred to herein as a CSI-RS resource ID. To distinguish the X parameter for CSI-RS from the X parameter for DM-RS, the X parameter for CSI-RS is referred to herein as $X_{CSIRS}$, and the X parameter for DM-RS is referred to herein as $X_{DMRS}$. Similarly, to distinguish the $n_s$ parameter for CSI-RS from the ns parameter for DM-RS, the $n_s$ parameter for CSI-RS is referred to herein as $n_s^{CSIRS}$, and the $n_s$ parameter for DM-RS is referred to herein as $n_s^{DMRS}$.

A set of RS antenna port(s) (of the same type) can be considered to be quasi co-located by the UE according to predefined rules are provided in TABLE 1 below.

TABLE 1

| Example groupings | CRS antenna port | DMRS antenna port | CSI-RS antenna port (per CSI-RS resource) |
|---|---|---|---|
| Example 1 | (0, 2), (1, 3) (suitable for interleaved indoor deployments) | (7, 8), (9, 10), (11, 13), (12, 14) | (15, 16), (17, 18), (19, 20), (21, 22) |
| Example 2 | (0, 1), (2, 3) (optimized for 2tx non interleaved deployments) | (7, 8), (9, 10), (11, 13), (12, 14) | (15, 16), (17, 18), (19, 20), (21, 22) |
| Example 3 | (0, 1, 2, 3) | (7, 8, 9, 10, 11, 12, 13, 14) (107, 108, 109, 110) | (15, 16, 17, 18, 19, 20, 21, 22) |

Embodiments of the present disclosure provide methods for UE to determine which set of RS ports (DM-RS, CSI-RS, and CRS) can be considered quasi co-located so that the UE is allowed to derive the "large scale properties" of one RS port, (e.g., properties needed for channel estimation/time-frequency synchronization based on the RS port) from measurement on another RS port. The large scale properties may include, for example, and without limitation, Doppler shift, Doppler spread, average delay, delay spread, frequency shift, average received power (may only be relevant for ports of the same type), average gain, and/or received timing. Correctly estimating the large scale properties can be important to ensure good channel estimation performance, e.g. minimum mean square error (MMSE) based channel estimator, which may require information, such as the path delay profile estimate (for accurate frequency correlation estimate), Doppler estimate (for accurate time-correlation estimate), noise variance, etc. Additionally, embodiments of the present disclosure provide details on signaling required to determine the DL timing reference for DL signal receptions (e.g., for CoMP deployment scenarios).

When DL CoMP transmission is configured for a UE, the downlink timing arrival from different TPs can be different due to the unequal distances from the UE to the various TPs.

For the CoMP scenario 3, if the UE is a macro UE (i.e., RRC connected or camped to the macro eNB/TP), the UE DL timing may be synchronized with the high-powered macro cell/TP even though a low-powered TP can be nearer to the UE. For example, the UE may miss the first transmitted signal paths from the low-powered TP that can contain significant energy before the UE DL timing reference according to the farther high-powered macro TP. Similarly, for the CoMP scenario 4, the UE may miss the first transmitted signal paths from the low-powered TP if the UE also uses the CSI-RS of the macro TP to assist with DL timing synchronization (different TP is assumed to transmit different CSI-RS for this scenario). As a result, the downlink timing determined by the UE for DL CoMP transmission will be suboptimal, which degrades the performance of CoMP (e.g., in JT or DPS).

Proposed solutions in U.S. patent application Ser. No. 13/626,572 include that when DL CoMP transmission (e.g., JT or DPS) is configured, the DL timing reference for CoMP reception shall be defined as the time when (e.g., the first detected path (in time)) of the corresponding downlink frame is received from the reference cell or reference TP. The UE may determine the downlink timing of a TP/cell from a reference signal received from the TP/cell (e.g., the primary synchronization signal (PSS), the secondary synchronization signal (SSS), the CRS, the CSI-RS, and/or some other reference signal). Also, a TP may correspond to a CSI-RS configuration (e.g., index tuple of a configuration index, a subframe configuration index, and a number of CSI-RS ports). An alternative for the DL timing reference for the cell/TP includes that any TP belonging to the CoMP measurement set with the earliest path arrival, min {t1, t2, . . . , tK}, where tk is the path arrival timing for TP k and K is the number of TPs. One advantage of this arrangement is that the need for additional signaling of the reference TP/cell can be avoided. For example, the CoMP measurement set is according to the definition in 3GPP TR 36.819 V11.0.0 (2011 September) and is configured by RRC. If a TP (i.e., TP A) is chosen among three TPs (i.e., TP A, TP B, and TP C) by the network entity for DL transmission in subframe n (e.g., DPS), but TP C was determined by the UE to have the earliest detected, the downlink timing reference for subframe n shall be according to TP C. Due to the semi-static nature of the CoMP measurement set configuration, the timing reference for the cell/TP may not change in a very dynamic manner.

An alternative for the DL timing reference for the cell/TP includes that a TP is signaled by the network entity (e.g., from among the DL CoMP set (e.g., from CSI/RSRP measurement) or the UL CoMP set (e.g. from SRS measurement)). Advantages of this arrangement include flexibility for the network entity and simplified implementation at the UE. Optionally, the network entity may also signal the physical signals to be used by the UE to achieve DL timing synchronization for DL CoMP reception, (e.g., CRS or CSI-RS). Advantages of these embodiments include that potentially strong multi-paths from a TP/cell that arrive early at the UE are not missed by the UE in the DL reception for CoMP, thereby improving the performance of CoMP.

Figure 2:
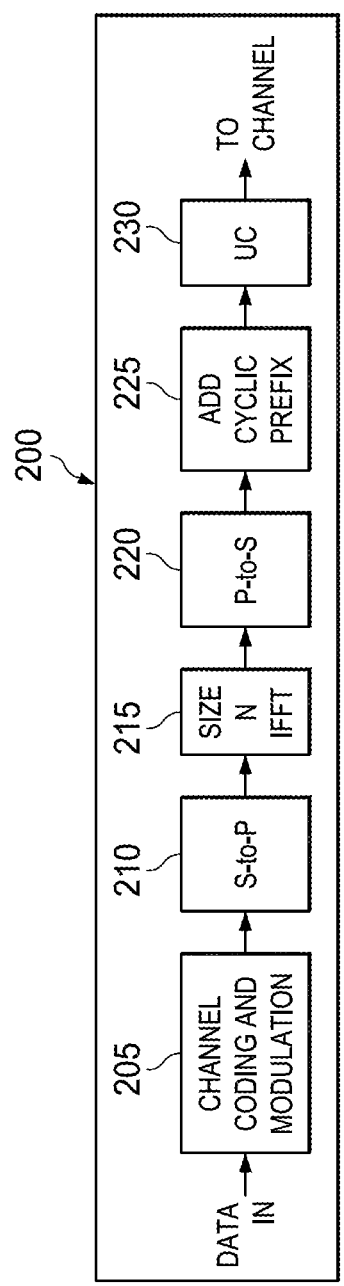
FIG. 2 illustrates a high-level diagram of an orthogonal frequency division multiple access transmit path in accordance with an illustrative embodiment of the present disclosure.
Figure 3:
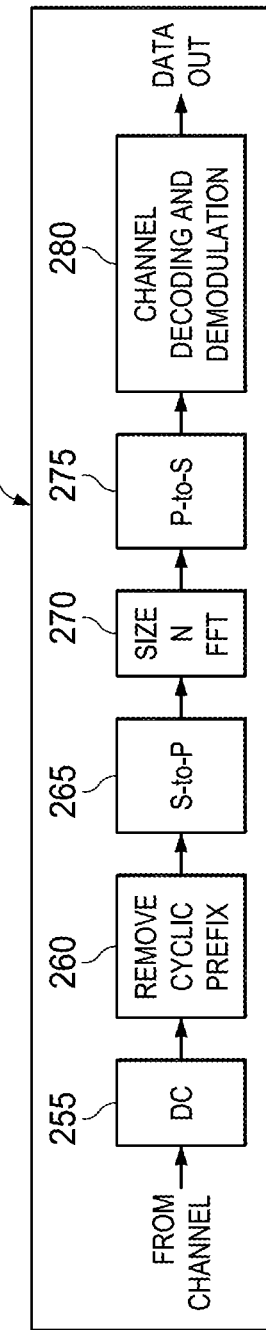
FIG. 3 illustrates a high-level diagram of an orthogonal frequency division multiple access receive path in accordance with an illustrative embodiment of the present disclosure.

FIGS. 1-3 below describe various embodiments implemented in wireless communications systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with a network 130, such as the Internet or a similar IP-based system (not shown).

Base station 102 provides wireless broadband access (via base station 101) to network 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to network 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via network 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., Turbo coding), and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to base stations 101-103 and may implement a receive path corresponding to the architecture for receiving in the downlink from base stations 101-103.

Figure 4:
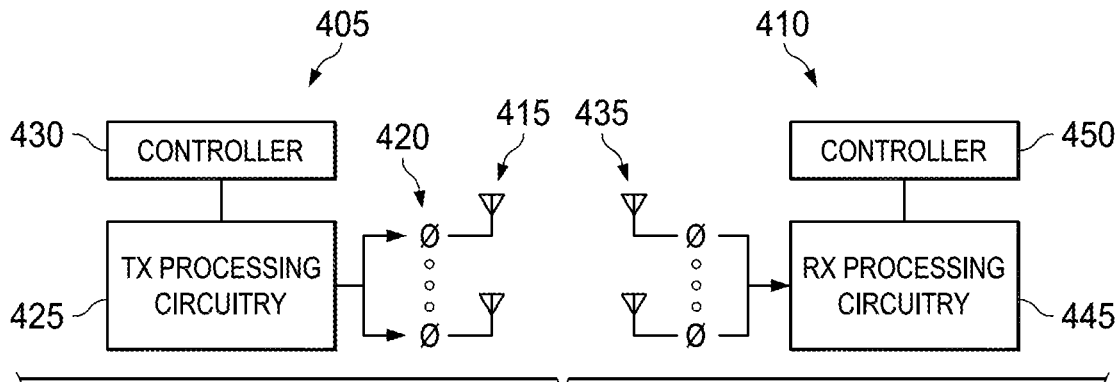
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that may be used to implement various embodiments of the present disclosure. In this illustrative example, the transmitter 405 and the receiver 410 are devices at a communication point in a wireless communications system, such as, for example, wireless system 100 in FIG. 1. In some embodiments, the transmitter 405 or the receiver 410 may be a network entity, such as a base station, e.g., an evolved node B (eNB), a remote-radio head, a relay station, an underlay base station; gateway (GW); or base station controller (BSC). In other embodiments, the transmitter 405 or the receiver 410 may be a UE (e.g., mobile station, subscriber station, etc.). In one example, the transmitter 405 or the receiver 410 is an example of one embodiment of the UE 116 in FIG. 1. In another example, the transmitter 405 or the receiver 410 is an example of one embodiment of the base station 102 in FIG. 1.

The transmitter 405 comprises antenna(s) 415, phase shifters 420, TX processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via transmitter 405. For example, the TX processing circuitry 425 may implement a transmit path that is analogous to the transmit processing circuitry 200 in FIG. 2. Transmitter 405 may also perform spatial multiplexing via layer mapping to different antennas in antenna(s) 415 to transmit signals in multiple different beams. The controller 430 controls the overall operation of transmitter 405. In one such operation, controller 430 controls the transmission of signals by the transmitter 405 in accordance with well-known principles.

Receiver 410 receives from antenna(s) 435 an incoming RF signal or signals transmitted by one or more transmission points, such as base stations, relay stations, remote radio heads, UEs, etc. Receiver 410 includes RX processing circuitry 445 that processes the received signal(s) to identify the information transmitted by the transmission point(s). For example, the RX processing circuitry 445 may down-convert the incoming RF signal(s) to produce an intermediate frequency (IF) or a baseband signal by channel estimating, demodulating, stream separating, filtering, decoding, and/or digitizing the received signal(s). For example, the RX processing circuitry 445 may implement a receive path that is analogous to the receive processing circuitry 300 in FIG. 3. The controller 450 controls the overall operation of the receiver 410. In one such operation, the controller 450 controls the reception of signals by the receiver 410 in accordance with well-known principles.

In various embodiments, the transmitter 405 is located within a TP, and the receiver is located within a UE in a CoMP communication system. For example, in the CoMP communication, multiple TPs may include transmitters similar to the transmitter 405 that transmits to the UE. The multiple TPs may be any combination of base stations (e.g., eNB, macro base stations, etc.), RHHs, and/or underlay base stations (e.g., micro base stations, relay stations, etc.).

The illustration of transmitter 405 and receiver 410 illustrated in FIG. 4 is for the purposes of illustrating one embodiment in which embodiments of the present disclosure may be implemented. Other embodiments of the transmitter 405 and the receiver 410 could be used without departing from the scope of this disclosure. For example, the transmitter 405 may be located in a communication node (e.g., BS, UE, RS, and RRH) that also includes a receiver, such as receiver 410. Similarly, the receiver 410 may be located in a communication node (e.g., BS, UE, RS, and RRH) that also includes a transmitter, such as transmitter 405. Antennas in the TX and RX antenna arrays in this communication node may overlap or be the same antenna arrays used for transmission and reception via one or more antenna switching mechanisms.

Figure 5:
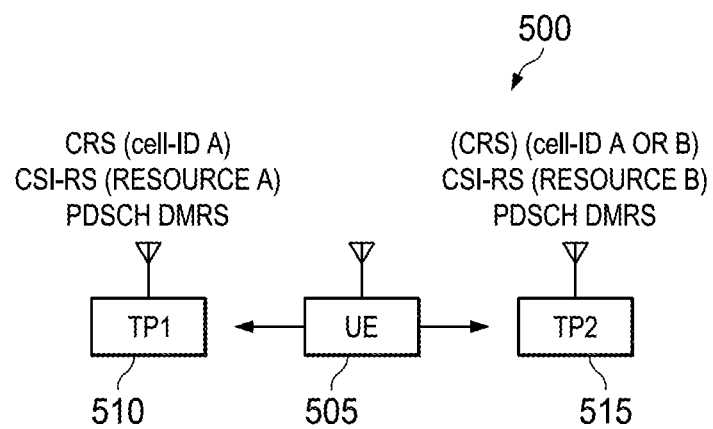
FIG. 5 illustrates a block diagram of a CoMP communication system in accordance with various embodiments of the present disclosure.

FIG. 5 illustrates a block diagram of a CoMP communication system 500 in accordance with various embodiments of the present disclosure. In this illustrative example, the CoMP communication system 500 includes a UE 505 and two TPs 510 and 515. For example, the UE 505 may include a receiver and transmitter as illustrated in FIG. 4. The TPs 510 and 515 may also include a receiver and transmitter as illustrated in FIG. 4. The TPs 510 and 515 may be any combination of base stations (e.g., eNB, macro base stations, etc.), RRHs, and/or underlay base stations (e.g., micro base stations, relay stations, etc.). Additionally, TPs and UEs may be present in the CoMP communication system 500. For example, more than two TPs may communicate with the same UE 505.

As illustrated in FIG. 5, the UE 505 may be located anywhere between or around the TPs 510 and 515. In order to properly perform timing and/or frequency synchronization and/or channel estimation with the TPs 510 and 515, the UE 505 may need to identify properties of the TPs 510 and 515. For example, the UE 505 may need to identify the large scale properties of reference symbol ports associated with the TPs 510 and 515. To assist in identifying these properties, the UE 505 may consider certain antenna ports to be 'quasi co-located'. For example, the 'quasi co-located' antenna ports may in-fact be co-located (i.e., transmitted from the same TP, antenna array, or antenna) or 'quasi co-located' antenna ports may be located in different TPs (e.g., TPs that may have similar channel properties). Either way, from the perspective of the UE 505, the concern is whether the UE can derive the large scale properties of one port from the large scale properties of another port. In other words, the UE 505 may not care whether the ports are actually physically co-located, just that the properties of the ports are similar enough to use for channel estimation, timing synchronization, and/or frequency synchronization. According to 3GPP TS 36.211 (sec 6.2.1), which is expressly incorporated by reference herein, two antenna ports are said to be quasi co-located if the large-scale properties of the channel over which a symbol on one antenna port is conveyed can be inferred from the channel over which a symbol on the other antenna port is conveyed.

Various embodiments provide methods to enable a network entity to inform the UE of a pair of DM-RS and CSI-RS ports that may be considered quasi co-located by the UE, so that the UE can derive the large scale channel properties for channel estimation for the CSI-RS port based on the DM-RS port. The network entity may inform the UE via implicit signaling. For example, a DM-RS port may be considered quasi co-located with a CSI-RS port if certain predefined conditions known by the UE (and the eNB) are satisfied, (e.g., by checking existing parameter values related to DM-RS and CSI-RS). In other embodiments, the network entity may inform the UE via explicit signaling. For example, the network entity may explicitly configure the CSI-RS port/resource that can be considered quasi co-located with a DM-RS port. In other embodiments, the network entity may inform the UE via mixed implicit and explicit signaling (e.g., implicit signaling can be complemented by explicit signaling).

In one example of implicit signaling, a DM-RS port may be assumed by the UE to be quasi co-located with a CSI-RS resource if the following conditions are satisfied. The parameter $X_{DMRS}$ used in sequence initialization to derive the DM-RS sequence (e.g., in equation 3 below) and the parameter $X_{CSIRS}$ (configured for a CSI-RS resource) used in sequence initialization to derive the CSI-RS sequence (e.g., in equation 4 below) are configured to the same value. In addition, the parameter $n_s^{DMRS}$ and the parameter $n_s^{CSIRS}$ are also configured and/or determined to be the same value.

One example of an equation for calculating the DM-RS sequence initialization equation is provided in equation 3 below:

$$c_{init} = (\lfloor n_s^{DMRS}/2 \rfloor + 1) \cdot (2 \cdot X_{DMRS} + 1) \cdot 2^{16} + n_{SCID} \quad (3)$$

One example of an equation for calculating the CSI-RS sequence initialization equation is provided in equation 4 below:

$$c_{init} = 2^{10} \cdot (7 \cdot (n_s^{CSIRS} + 1) + l + 1) \cdot (2 \cdot X_{CSIRS} + 1) + 2 \cdot X_{CSIRS} + N_{CP} \quad (4)$$

Additionally, to assist the UE channel estimation or time/frequency synchronization, the network entity may configure the X parameters for DM-RS and CSI-RS transmissions (i.e., $X_{DMRS}$, $X_{CSIRS}$) from a TP to be the same value and, similarly, the $n_s$ parameters for DM-RS and CSI-RS transmissions ($n_s^{DMRS}$, $n_s^{CSIRS}$) from a TP to be the same value.

Figure 6:
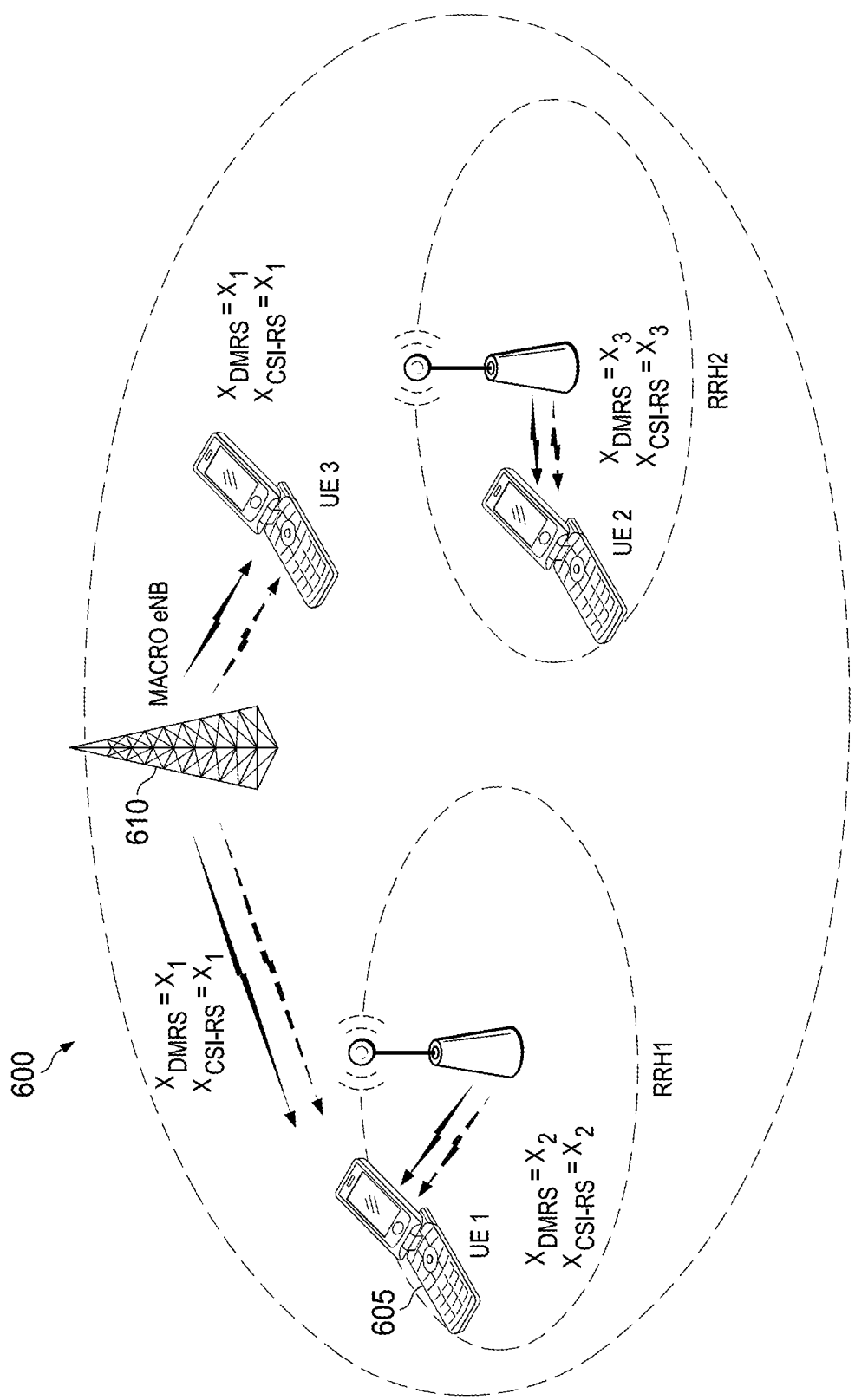
FIG. 6 illustrates a DM-RS and CSI-RS parameter configuration in a CoMP communication system according to various embodiments of the present disclosure.

FIG. 6 illustrates a DM-RS and CSI-RS parameter configuration in a CoMP communication system 600 according to various embodiments of the present disclosure. In this illustrative embodiment, $n_s$ is assumed to be common for all TPs under the coverage of macro TP 610. This example is applicable for the CoMP scenarios 3 and 4.

As illustrated, the UE 605 can be RRC configured with two X values {X1, X2} for DMRS scrambling. Assuming DPS type CoMP transmission, depending on the dynamically chosen X value in the downlink grant, the UE 605 can derive the corresponding CSI-RS resource with the same X value as quasi co-located with the DMRS and thus, shares the same large scale properties. If more than one CSI-RS resource configured for the UE have the same $X_{CSIRS}$ values, the multiple CSI-RS resources with the same $X_{CSIRS}$ values may correspond to multiple sets of CSI-RS ports that are not quasi co-located. As a result, the conditions stated above may not be sufficient. When the UE 605 is scheduled, a PDSCH and a DM-RS port(s) with the same $X_{DMRS}$ value as the $X_{CSIRS}$ shared by multiple CSI-RS resources, there is an ambiguity on which a CSI-RS resource the UE 605 may assume the quasi co-location to hold. To resolve this issue, the UE 605 can be signaled (e.g., in the PDCCH or EPDCCH that schedules the PDSCH) which CSI-RS resource is quasi co-located with the DM-RS corresponding to the scheduled PDSCH as illustrated, for example, in TABLE 2 below. This is an example of mixed implicit and explicit signaling. The signaling bits in the DCI format may be present only if there are multiple CSI-RS resources with the same $X_{CSIRS}$ value that cannot be assumed quasi co-located. In one embodiment, the UE 605 may assume the signaling exists if the UE 605 determines that there are multiple CSI-RS resources with the same $X_{CSIRS}$ value. In another embodiment, the UE 605 only assumes the signaling exists if a higher layer signaling indicates as such. In yet another embodiment, the signaling is assumed to exist whenever there are multiple CSI-RS resources configured.

The number of bits in the DCI format can be $\log_2(N)$, where N is the number of CSI-RS resources configured to the UE (CoMP measurement set size), the maximum number of CSI-RS resources that can be configured to the UE (maximum CoMP measurement set size), or fixed to a value (e.g., 1 or 2). If the number of CSI-RS resources configured to the UE 605 is more than the fixed value, higher layer signaling (e.g., RRC) can be used to indicate which subset of the CSI-RS resources configured shall be addressed by the signaling bits in the DCI format. TABLE 2 illustrates example signaling to indicate the quasi co-located CSI-RS resource with the assigned DM-RS (i.e., 1 bit signaling to switch between two CSI-RS resources).

TABLE 2

| DCI field value | CSI-RS resource considered quasi co-located with the assigned DM-RS in the DCI |
|---|---|
| 0 | CSI-RS resource 1 |
| 1 | CSI-RS resource 2 |

In another example, a single CSI-RS resource may correspond to multiple groups of ports, where each group is quasi-co-located, while the individual groups are not quasi co-located. The network entity may configure the CSI-RS resources this way to support transparent joint transmission with a single CSI-RS resource. In this example, the signaling described above may also include information of a port index (or a port group or port pair) in addition to a CSI-RS resource, for example, as illustrated in TABLE 3. In another example, the UE may assume that quasi co-location association only applies to a fixed port, (e.g., the first port of the corresponding CSI-RS resource (or the first and the second port)). In another example, whether the relation applies to a fixed port index or the whole set may be configurable by the network entity, for example, based on whether transparent JT CoMP is supported. TABLE 3 illustrates example signaling to indicate the quasi co-located CSI-RS resource and port with the assigned DM-RS (e.g., two bit signaling to switch between four combinations of CSI-RS resources and ports).

TABLE 3

| DCI field value | CSI-RS resource considered quasi co-located with the assigned DM-RS in the DCI |
| --- | --- |
| 00 | CSI-RS resource 1, CSI-RS port x1 |
| 01 | CSI-RS resource 1, CSI-RS port x2 |
| 10 | CSI-RS resource 2, CSI-RS port y1 |
| 11 | CSI-RS resource 2, CSI-RS port y2 |

In various embodiments, the UE may first be configured with a set of $X_{DMRS}$ and CSI-RS resources. The UE then determines which DM-RS port with a $X_{DMRS}$ value and CSI-RS resource is to be assumed quasi co-located as described above. Upon receiving PDCCH or EPDCCH, the UE checks the assigned $X_{DMRS}$ value and any additional signaling (if present) that indicates a single CSI-RS resource (and port or ports when there are multiple CSI-RS resources with the matching $X_{CSIRS}$ value) and determines the quasi co-location relationship(s).

Embodiments of the present disclosure recognize that explicit signaling to complement the implicit $X_{DMRS}$ and $X_{CSIRS}$ condition checking may incur additional dynamic signaling overhead. To avoid or reduce the amount of dynamic signaling overhead needed, various embodiments of the present disclosure define, among the set of CSI-RS resources with the same $X_{CSIRS}$ value, the quasi co-location relationship between a CSI-RS resource (and port(s)) and a DM-RS port index. For example, the first CSI-RS resource (and the port(s) x(s)) are assumed quasi co-located with DM-RS port 7 (which has the same $X_{DMRS}$ value as the $X_{CSIRS}$ value), and the second CSI-RS resource (and the port(s) y(s)) are assumed quasi co-located with DM-RS port 8 (which has the same $X_{DMRS}$ value as the $X_{CSIRS}$ value), etc. as illustrated, for example, in TABLE 4 below. In another example, higher signaling may explicitly indicate which DM-RS port index/indices may be assumed to be quasi co-located with a CSI-RS resource (and port(s)) or vice versa, and this signaling can be provided along with a CSI-RS configuration RRC message. For example, if both port 7 and port 8 are assigned to the UE in the same subframe, the default quasi co-located CSI-RS resource (and port(s)) can be defined (e.g. the first CSI-RS resource (and the first port)). TABLE 4 illustrates an example of quasi co-location association between DM-RS port index and CSI-RS resource (and port).

TABLE 4

| DM-RS port index (assigned in DCI) | CSI-RS resource (and port) considered quasi co-located with the DM-RS port |
| --- | --- |
| 7 | CSI-RS resource 1 (and port x) |
| 8 | CSI-RS resource 2 (and port y) |

In various embodiments, the UE is configured with the set of $X_{DMRS}$ and CSI-RS resources. The UE then determines which DM-RS port with a $X_{DMRS}$ value and CSI-RS resource is to be assumed quasi co-located as described above. Upon receiving PDCCH/EPDCCH, the UE checks the assigned $X_{DMRS}$ value and the DM-RS port index determine the quasi co-location relationship (e.g., as illustrated in TABLE 4).

If CoMP JT is supported and/or configured and a single CSI-RS resource may consist of CSI-RS ports that cannot be assumed to be quasi co-located, the X parameters condition checking may not be sufficient. In this example, there may be only one CSI-RS resource configured. This issue may be resolved by additionally defining that a DM-RS port with index j may be assumed to be quasi co-located with the CSI-RS port index j+8 (assuming that the port indexing of a CSI-RS resource starts from port 15) as illustrated, for example, in TABLE 5. For example, if a UE is configured with 2 CSI-RS ports (e.g., ports 15 and 16), and if the UE is assigned DM-RS port 7 for PDSCH demodulation, the UE can derive the large scale channel properties required for the DMRS port 7 channel estimation from measuring CSI-RS port 15, but the UE cannot use CSI-RS port 16 for the same purpose. Whether or not the UE should apply this assumption can be signaled/configured by the network. In some embodiments, this additional definition may be used in a stand-alone manner, i.e. independently of other quasi co-location indication techniques. TABLE 5 illustrates an example quasi co-location association between DM-RS port index and CSI-RS port.

TABLE 5

| DM-RS port index (assigned in DCI) | CSI-RS port considered quasi co-located with the DM-RS port |
| --- | --- |
| 7 | CSI-RS port 15 |
| 8 | CSI-RS port 16 |

The quasi co-location relationship between the DM-RS and the CSI-RS can be given by explicit RRC signaling from the network (i.e., no condition between $X_{DMRS}$ and $X_{CSIRS}$ is necessary). In one embodiment, this explicit signaling includes that for each DM-RS resource configured for the UE, there is also a CSI-RS resource (and port(s) within a resource), indicated by the network entity, where the UE may assume quasi co-location to hold for the corresponding DM-RS ports and CSI-RS ports. In one example of explicit signaling, the network entity may configure the UE with a set of $X_{DMRS}$ values (e.g., $X_{DMRS}(0)$ and $X_{DMRS}(1)$) and a set of CSI-RS resources (i.e., M sets of CSI-RS resources). For each $X_{DMRS}$ configured, there may be $\log_2(M)$ bits to indicate which CSI-RS resource the UE may assume quasi co-location to hold, for example, as illustrated in TABLE 6 below. In another example, a bitmap of M bits can be configured for each $X_{DMRS}$ configured. One advantage of the bitmap approach is that more than one CSI-RS resource can be indicated to be quasi co-located with the DM-RS. The signaling may also include the port indices within each CSI-RS resource, and additional signaling bits may be needed. To provide further flexibility of quasi co-location association for the network entity, the DM-RS port index for the same DM-RS resource may also be indicated, for example, as illustrated in TABLE 7 below. If the quasi co-location association (e.g., as illustrated in TABLE 6 or TABLE 7) is configured (e.g., by RRC), the DCI signaling of $X_{DMRS}$ and port index indicates the quasi co-located CSI-RS resource (and port).

TABLE 6 illustrates an example of explicit signaling for quasi co-location association between DM-RS resources and CSI-RS resources (and ports). CSI-RS resources 1 and 2 may or may not be the same CSI-RS resource. Similarly, ports x and y may or may not be the same port index.

TABLE 6

| DM-RS Resource | CSI-RS resource (and port) considered quasi co-located with the DM-RS resource |
| --- | --- |
| $X_{DMRS}(0)$ | CSI-RS resource 1 (and port x) |
| $X_{DMRS}(1)$ | CSI-RS resource 2 (and port y) |

TABLE 7 illustrates an example of explicit signaling for quasi co-location association between DM-RS resources and CSI-RS resources (and ports). Any pair of CSI-RS resource 1, 2, 3, 4 may be the same or different CSI-RS resource. Similarly, any pair of port x1, . . . , x4 may be the same or different port index.

TABLE 7

| DM-RS Resource and port | CSI-RS resource (and port) considered quasi co-located with the DM-RS resource and port |
|---|---|
| $X_{DMRS}(0)$ and port 7 | CSI-RS resource 1 (and port x1) |
| $X_{DMRS}(0)$ and port 8 | CSI-RS resource 2 (and port x2) |
| $X_{DMRS}(1)$ and port 7 | CSI-RS resource 3 (and port x3) |
| $X_{DMRS}(1)$ and port 8 | CSI-RS resource 4 (and port x4) |

If more than one DM-RS port can be further assumed quasi co-located (e.g., by predefining the quasi co-location relationship in the specification or by network signaling as discussed in greater detail below), the UE may be able to use more CSI-RS ports (which are determined according to aforementioned conditions) to improve the estimation by the UE of the large scale channel properties by averaging over the measurements from the CSI-RS ports. In one embodiment, the network entity may have an option to signal a choice between one of the described associations for quasi co-location or assume that a DMRS port cannot be assumed co-located with any CSI-RS port.

Various embodiments provide methods to enable the network to inform the UE which pair of DM-RS and CRS ports may be considered quasi co-located by the UE such that the UE can derive the large-scale channel properties required for channel estimation for the CRS port based on the DM-RS port. The network entity may inform the UE via implicit signaling. For example, a DM-RS port may be considered quasi co-located with a CRS port if certain predefined conditions known by the UE (and the eNB) are satisfied, (e.g., by checking of existing parameter values related to DM-RS and CRS). In other embodiments, the network entity may inform the UE via explicit signaling. For example, the network entity may explicitly configure the CRS port/resource that can be considered quasi co-located with a DM-RS port. In other embodiments, the network entity may inform the UE via mixed implicit and explicit signaling (e.g., implicit signaling can be complemented by explicit signaling).

In one example of implicit signaling, a DM-RS port may be assumed by the UE to be quasi co-located with a CRS resource if the following conditions are satisfied. The parameter $X_{DMRS}$ used in sequence initialization to derive the DM-RS sequence (e.g., in equation 5 below) and the parameter $N_{ID}^{cell}$ used in sequence initialization to derive the CRS sequence (e.g., in equation 6 below) are the same value. In addition, the parameter $n_s^{DMRS}$ and the parameter $n_s^{CRS}$ are also configured and/or determined to be the same value.

One example of an equation for calculating the DM-RS sequence initialization equation is provided in equation 5 below:

$$c_{init} = (\lfloor n_s^{DMRS}/2 \rfloor + 1) \cdot (2 \cdot X_{DMRS} + 1) \cdot 2^{16} + n_{SCID} \quad (5)$$

One example of an equation for calculating the CRS sequence initialization equation is provided in equation 6 below:

$$c_{init} = 2^{10} \cdot (7 \cdot (n_s^{CRS} + 1) + l + 1) \cdot (2 \cdot N_{ID}^{cell} + 1) + 2 \cdot N_{ID}^{cell} + N_{CP} \quad (6)$$

The scrambling sequence itself can be generated according to 3GPP TS 36.211 § 6.10.1.1, which is expressly incorporated by reference herein. The $N_{ID}^{cell}$ for the CRS port can correspond to the serving cell or can correspond to one of the detected or reported neighboring cells (e.g., where the RSRP/RSRQ report of the neighboring cell was sent). If $N_{ID}^{cell}$ corresponds to one of the neighboring cells, this implies DL CoMP operation (i.e., the UE is actually receiving DM-RS and PDSCH from the neighboring cell instead of the serving cell). If the parameter $X_{DMRS}$ of DM-RS port does not match any known neighboring cells' $N_{ID}^{cell}$, the UE may assume that the corresponding DM-RS port is quasi co-located with the CRS port of the serving cell. In one embodiment, the UE may only assume a DM-RS port is quasi co-located with the CRS port of the serving cell if the parameter $X_{DMRS}$ of the DM-RS port matches with the serving cell's $N_{ID}^{cell}$.

If there is more than one CRS port available for a serving cell or a neighboring cell with the same $N_{ID}^{cell}$ and $n_s^{CRS}$, and if the CRS ports cannot be assumed to be quasi co-located by the UE, the network entity can additionally signal which CRS port is to be assumed to be quasi co-located with a DM-RS port (e.g., port 0, port 1, port 2, port 3, a subset of CRS ports, or all CRS ports). The signaling can be done in a semi-static manner (e.g., via MAC or RRC signaling) or in a dynamic manner (e.g., signaling in PDCCH). The default can be CRS port 0, all CRS ports, or provided by higher layer signaling if dynamic signaling in PDCCH is used to indicate a value that may be different from the default value. This is an example of mixed implicit and explicit signaling. In another example, the quasi co-location assumption of DM-RS ports and CRS ports can be predefined (e.g., as illustrated in TABLE 8 below). One advantage of a predefined rule is saving of signaling overhead. TABLE 8 illustrates rules for quasi co-located ports.

TABLE 8

| Quasi co-located set | CRS ports indices | DM RS ports indices |
|---|---|---|
| Set 1 | (0) or (0, 3) | EX1: (7) |
| | | EX2: (7, 8) |
| | | EX3: (7, 8, 11, 13) |
| Set 2 | (1) or (1, 2) | EX1: (8) |
| | | EX2: (9, 10) |
| | | EX3: (9, 10, 12, 14) |

To provide additional flexibility for the network entity, the quasi co-location assumption according to the methods described above may only be valid if indicated by the network entity (i.e. it may also be possible for the network entity to indicate that the quasi co-location of the CRS port and the DM-RS port cannot be assumed by the UE).

The quasi co-location relationship between the DM-RS and the CRS can be given by explicit signaling from the network entity. One method of explicit signaling includes that for each DM-RS resource configured for the UE, there is also a CRS resource and/or port(s) within a resource, indicated by the network, where the UE may assume quasi co-location to hold for the corresponding DM-RS ports and CRS ports. A CRS resource can be given by a configuration of an $n_s^{CRS}$.

Allowing the UE to assume quasi co-location of a DM-RS port with a CRS port may be beneficial to improve time and/or frequency synchronization or to improve the channel estimation performance for the DM-RS port in order to improve the PDSCH demodulation performance. These embodiments also extend to quasi co-location relationship of DM-RS and tracking RS (TRS) that may exist in a non-backward compatible carrier (i.e., a new carrier type) to facilitate time/frequency synchronization. In these embodiments, there may only be one TRS port.

Various embodiments provide methods to enable a network entity to inform the UE of a pair of CSI-RS and CRS ports may be considered quasi co-located by the UE, so that the UE can derive the large scale channel properties required for channel estimation or time/frequency synchronization for the CSI-RS port based on the CRS port. The network entity may inform the UE via implicit signaling. For example, a CSI-RS resource and/or port may be considered quasi co-located with a CRS port if certain predefined conditions known by the UE (and the eNB) are satisfied, (e.g., by checking of existing parameter values related to CRS and CSI-RS). In other embodiments, the network entity may inform the UE via explicit signaling. For example, the network entity may explicitly configure the CRS port and/or resource that can be considered quasi co-located with a CSI-RS port and/or resource. In other embodiments, the network entity may inform the UE via mixed implicit and explicit signaling (e.g., implicit signaling can be complemented by explicit signaling).

In one example of implicit signaling, a CSI-RS resource and/or port can be assumed by the UE to be quasi co-located with a CRS port if the following conditions (hereinafter "Conditions A") are satisfied.

The parameter $X_{CSIRS}$ used in sequence initialization to derive the CSI-RS sequence (e.g., in equation 7 below) and the parameter $N_{ID}^{cell}$ used in sequence initialization to derive the CRS sequence are the same value. In addition, the parameter $n_s^{CSIRS}$ and the parameter $n_s^{CRS}$ are also configured and/or determined to be the same value.

One example of an equation for calculating the CSI-RS sequence initialization equation is provided in equation 7 below:

$$c_{init} = 2^{10} \cdot (7 \cdot (n_s^{CSIRS}+1)+l+1) \cdot (2 \cdot X_{CSIRS}+1) + 2 \cdot X_{CSIRS} + N_{CP} \quad (7)$$

One example of an equation for calculating the CRS sequence initialization equation is provided in equation 8 below:

$$c_{init} = 2^{10} \cdot (7 \cdot (n_s^{CRS}+1)+l+1) \cdot (2 \cdot N_{ID}^{cell}+1) + 2 \cdot N_{ID}^{cell} + N_{CP} \quad (8)$$

The $N_{ID}^{cell}$ for the CRS port can correspond to the serving cell or can correspond to one of the detected neighboring cells/reported neighboring cells (e.g., where the RSRP/RSRQ report of the neighboring cell was sent). If $N_{ID}^{cell}$ corresponds to one of the neighboring cells, it implies DL CoMP operation (i.e., the UE is actually receiving CSI-RS from the neighboring cell instead of the serving cell). If the parameter $X_{CSIRS}$ of CSI-RS resource and/or port does not match any known neighboring cells' $N_{ID}^{cell}$, the UE may assume that the corresponding CSI-RS resource and/or port is quasi co-located with the CRS port of the serving cell. In one embodiment, the UE may only assume a CSI-RS resource and/or port is quasi co-located with the CRS port of the serving cell if the parameter $X_{CSI-RS}$ of CSI-RS resource and/or port matches the serving cell's $N_{ID}^{cell}$. In some embodiments, the large scale properties referred to may be limited to the received timing only as the CSI-RS density may not be enough for the UE to acquire accurate timing information. In other embodiments, the large scale properties referred to may additionally or alternatively include delay spread, Doppler spread, and frequency shift.

If there are more than one CRS ports with the same $N_{ID}^{cell}$ and $n_s^{CRS}$, and if the CRS ports cannot be assumed to be quasi co-located by the UE, the network entity can signal which CRS port is to be assumed to be quasi co-located with each CSI-RS resource and/or port (e.g., port 0, port 1, port 2, port 3, a subset of ports, or all CRS ports). The signaling can be done in a semi-static manner (e.g. MAC or RRC signaling). This is an example of a mixed implicit and explicit signaling method.

To provide additional flexibility for the network entity, the quasi co-location assumption as described above (i.e., in Conditions A) may only be valid if indicated by the network entity, (i.e., it is possible for the network entity to indicate that the quasi co-location of the CRS port and the CSI-RS port cannot be assumed by the UE). In one example, the quasi co-location assumption according to Conditions A is the default UE behavior unless higher-layer signaling is provided for a CSI-RS resource to indicate if quasi co-location with a CRS (complying with a certain condition) may not be assumed. Separate higher-layer signaling may be provided for separate CSI-RS resources for flexible configuration.

In another example, non-quasi co-location is the default UE assumption. Quasi co-location with a CRS (complying with a certain condition) may only be assumed if higher-layer signaling is provided for a CSI-RS resource. Separate higher-layer signaling can be provided for separate CSI-RS resources for flexible configuration. In another example, separate higher-layer signaling indications for different large scale channel properties are provided. For example, one higher-layer signaling indication is provided for the received timing and another is provided for the delay spread, Doppler spread, and frequency shift. These separate signaling indications are beneficial for the CoMP scenario 4 as a CSI-RS and a CRS may only share the same received timing, but not the other large-scale properties.

Based on the embodiments described above, one example design for release 11 UE behavior may include that a CSI-RS resource may be assumed quasi co-located with a CRS resource with respect to received timing if the virtual cell ID of the CSI-RS matches with cell ID of the CRS (e.g., cell IDs can correspond to that of the serving cell or one of the detected neighboring cells/reported neighboring cells (e.g., where the RSRP/RSRQ report of the neighboring cell was sent)). If no match is found, UE may only assume quasi co-location in terms of received timing with the CRS port of the serving cell. When the virtual cell ID of the CSI-RS and the cell ID of the CRS of a cell match (e.g., cell IDs can correspond to that of the serving cell or one of the detected neighboring cells/reported neighboring cells (e.g., where the RSRP/RSRQ report of the neighboring cell was sent)), quasi co-location assumption between the CSI-RS and the CRS with respect to certain properties (e.g., delay spread, frequency shift, Doppler spread) may also be assumed by the UE. This assumption can be the default UE assumption, unless higher-layer signaling indicates that the CSI-RS resource is not quasi co-located with the CRS with respect to the certain properties (e.g., delay spread, frequency shift, Doppler spread).

This example design may address the needs for CoMP scenarios 1, 2, 3, and 4 as described in 3GPP TS 36.819. For CoMP scenarios 1, 2, and 3, the virtual cell ID of the CSI-RS is normally the same as the cell ID. This may also be needed for supporting legacy UEs (e.g., release 10 UEs). For CoMP scenario 4, the virtual cell IDs of the TPs can either be the same as the serving cell in case the CSI-RSs are orthogonal in time and/or frequency, or the virtual cell IDs can be different for interference randomization purposes in case the TPs' CSI-RS REs overlap. In either case, for CoMP scenario 4, the UE may assume that the received timing for the CSI-RS is to be the same as the CRS of the serving cell. However, the quasi co-location assumption of delay spread and Doppler spread may not generally be assumed for CoMP scenario 4, since CRS may be transmitted in a system frame number (SFN) manner while CSI-RS can be transmitted only from a TP. Nevertheless, for CoMP scenarios 1, 2, and 3, as well as scenarios without CoMP, the quasi co-location assumption of the CSI-RS ports and the CRS ports will typically work. The demodulation performance may be unnecessarily degraded if the UE is not allowed to take advantage of the quasi co-location assumption. A common denominator for the aforementioned scenarios is that the virtual cell ID of the CSI-RS is normally the same as the cell ID (as assumed by legacy UEs as well), which can serve as the condition for the quasi co-location assumption. However, for CoMP scenario 4, such condition alone may not be sufficient, as multiple TPs may be configured with the same virtual cell id. Therefore, additional higher-layer signaling is provided for each CSI-RS resource to indicate if quasi co-location assumption with the CRS is not allowed.

The example design can also provide benefits of quasi co-location assumptions for a legacy UE (e.g., a release 10 UE). For example, a CSI-RS resource may be assumed quasi co-located with a CRS resource with respect to received timing, delay spread, frequency shift, and/or Doppler spread by legacy UEs. This assumption is valid for legacy UEs operating in a network that deploys CoMP scenario 1, 2, and 3. The assumption is also valid for a network that deploys CoMP scenario 4 as long as the CSI-RS and the CRS are transmitted from the same set of transmission points (e.g., SFN transmission).

Based on the embodiments described above, another example design for release 11 UE behavior may include that for each CSI-RS resource, the network entity indicates by higher-layer signaling (e.g., higher-layer signaling A) that CSI-RS ports and CRS ports may be assumed as quasi co-located with respect to one or more of the large-scale properties. If the higher layer signaling A indicates that CSI-RS ports and CRS ports may be assumed as quasi co-located with respect to one or more of the large-scale properties, the UE may assume quasi co-location with respect to one or more of the large-scale properties between all the CSI-RS ports of the CSI-RS resource and CRS ports, where the cell ID of the CRS ports (which can be the serving cell or the neighboring cells detected or reported by the UE) matches with the virtual cell ID of the CSI-RS resource. In the absence of network signaling (higher-layer signaling A), CSI-RS ports and CRS ports shall not be assumed as quasi co-located with respect to all properties.

The UE behavior described in the above example designs may be conditioned on whether release 11 CSI-RS resource(s) are configured. In other words, the quasi co-location assumptions above may only be applicable if release 11 CSI-RS resources information element (IE) of ASN.1 is configured. If the UE is configured with a legacy CSI-RS resource IE, then the UE behavior follows the legacy behavior. In another example, the UE behavior described in the above example designs may be conditioned on the transmission mode configured. Specifically, the quasi co-location assumptions above may only be applicable if transmission mode 10 is configured. If the UE is configured with transmission mode 9, then the UE behavior may follow the legacy behavior.

The quasi co-location relationship between the CSI-RS and the CRS may be given by explicit signaling from the network entity. One method of explicit signaling includes that for each CSI-RS resource and/or port configured for the UE, there is also a CRS resource and/or port(s) within a resource, indicated by the network, where the UE may assume quasi co-location to hold for the corresponding CSI-RS ports and CRS ports. A CRS resource can be given by a configuration of $N_{ID}^{cell}$ and $n_s^{CRS}$. $N_{ID}^{cell}$ determines the initialization of the CRS scrambling sequence and the frequency shift of the CRS resource elements according to 3GPP TS 36.211 § 6.10.1.1 and § 6.10.1.2, which are expressly incorporated by reference herein. Allowing the UE to assume quasi co-location of a CSI-RS resource and/or port with a CRS port is beneficial to improve the channel estimation and/or time/frequency synchronization performance for the CSI-RS resource and/or port, in order to improve the CSI feedback accuracy. This embodiment also extends to quasi co-location relationship of CSI-RS and tracking RS (TRS) that may exist in a non-backward compatible carrier (e.g., a new carrier type). In this case, there may be only one TRS port.

Based on the embodiments of the present disclosure described above, one example design for Rel-11 UE behavior may include that for each CSI-RS resource, the network entity indicates by higher layer signaling (e.g., higher-layer signaling A) that CSI-RS ports and CRS ports may be assumed as quasi co-located with respect to one or more of the large-scale properties. In one embodiment, if the higher-layer signaling A indicates that CSI-RS ports and CRS ports may be assumed as quasi co-located with respect to one or more of the large-scale properties, the UE may assume quasi co-location with respect to one or more of the large-scale properties between all the CSI-RS ports of the CSI-RS resource and CRS ports associated with the serving cell ID. In another embodiment, if the quasi co-location Type B signaling indicates that CSI-RS ports and CRS ports may be assumed as quasi co-located with respect to one or more of the large-scale properties (e.g., Doppler spread and Doppler shift), the network entity also indicates a cell ID (higher layer signaling B) based on which the UE may assume quasi co-location with respect to one or more of the large-scale properties between all the CSI-RS ports of the CSI-RS resource and CRS ports associated with the signaled cell ID. In another embodiment, higher-layer signaling A and higher-layer signaling B is the same. In other words, higher-layer signaling of the cell ID of the quasi co-located CRS also indicate that the CSI-RS is quasi co-located with the CRS associated with the cell ID. In the absence of network signaling (e.g., higher-layer signaling A), CSI-RS ports and CRS ports shall not be assumed as quasi co-located with respect to all properties.

Based on the embodiments of the present disclosure described above, another example design for release 11 UE behavior may include that the network entity indicates by higher layer signaling (e.g., higher-layer signaling C) that the CSI-RS ports of a CSI-RS resource X and the CRS ports of the serving cell may be assumed as quasi co-located with respect to one or more of the large-scale properties. The CSI-RS resource X can be fixed to that corresponding to the smallest CSI-RS resource ID of the CSI-RS resources configured (i.e., if there is only one CSI-RS resource configured, then CSI-RS resource X is the only CSI-RS resource configured). The CSI-RS resource X can be configured by higher layer signaling (e.g., RRC) to be CSI-RS resource, which is part of the release 11 CSI-RS resources configured. The signaling can indicate the CSI-RS resource ID. In the absence of network signaling (e.g., higher-layer signaling C), CSI-RS ports and CRS ports shall not be assumed as quasi co-located with respect to all properties.

The UE behavior described in the above example designs may be conditioned on whether release 11 CSI-RS resource(s) are configured. In other words, the behavior above may only be applicable if release 11 CSI-RS resources information element (IE) of ASN.1 is configured. If the UE is configured with a legacy (e.g., release 10) CSI-RS resource IE, then the UE behavior follows the legacy behavior. In another example, the UE behavior described in the above design examples may be conditioned on the transmission mode configured. For example, the behavior above may only be applicable if transmission mode 10 is configured. If the UE is configured with transmission mode 9, then the UE behavior follows the legacy behavior.

In various embodiments of the present disclosure, if more than one DM-RS port can be assumed to be quasi co-located, it may be advantageous to assign DM-RS ports belonging to the same CDM group to be quasi co-located so that the orthogonality of the DM-RS is not negatively affected. For example, ports 7 and 8 can be quasi co-located, and ports 9 and 10 can be quasi co-located.

In one example, the possible quasi co-location relationships of DM-RS ports are illustrated in TABLE 9 below. Network signaling (e.g., via RRC) may also be used to indicate which case of relationship is to be assumed by the UE (e.g., via 2-bit signaling).

TABLE 9

| | No. DM RS ports | | |
|---|---|---|---|
| Case | 2 | 4 | 8 |
| 0 | (7), (8) | (7), (8), (9), (10) | (7), (8), (9), (10), (11), (12), (13), (14) |
| 1 | (7, 8) | (7, 8), (9, 10) | (7, 8), (9, 10), (11, 13), (12, 14) |
| 2 | — | (7, 8, 9, 10) | (7, 8, 11, 13), (9, 10, 12, 14) |
| 3 | — | — | (7, 8, 9, 10, 11, 12, 13, 14) |

For case 1 above, when the number of DM-RS ports assigned is 4, the UE may assume ports 7 and 8 are quasi co-located, whereas ports 9 and 10 are quasi co-located.

The above described embodiments may be used to improve the channel estimation and/or time/frequency synchronization performance for PDSCH reception (based on DM-RS) or for CSI feedback (based on CSI-RS). In various embodiments, the UE may still receive the DL signals using a single FFT timing when configured to operate in CoMP. The following UE-specific signaling, which may be semi-static or dynamic, is proposed in order to assist the UE to determine the DL timing (i.e., FFT timing) for DL signal reception when configured to operate in CoMP, so that the SNR of DL signals reception can be enhanced. The network entity may provide network signaling (e.g. via RRC) to indicate if the UE may synchronize with DL signals (e.g., RS) from a non-serving cell (e.g., neighboring cell) or a TP (which may or may not have the same cell ID as the serving cell) for DL reception (e.g., PDSCH demodulation, CSI-RS reception, etc.). Without the signaling, the UE may synchronize with the serving cell. Furthermore, the network can indicate a specific cell (e.g., by cell ID) or TP (CSI-RS resource (and optionally cell ID)) for synchronization, or the UE can select from a CoMP measurement set configured as described in U.S. patent application Ser. No. 13/626,572. The TP may be indicated by a CSI-RS resource configuration (e.g. configuration index, subframe configuration index, number of CSI-RS ports, and signaling required for sequence initialization).

In addition, signaling can be provided to indicate the type of RS that should be used for synchronization, e.g. CRS, CSI-RS, or both. In case of CRS, additional signaling may be optionally provided by the network to indicate which CRS port should be used by the UE for synchronization, e.g. port 0 or 1 and the cell ID. The default port can be port 0 of the serving cell. In case of CSI-RS, the UE may recognize a CSI-RS port as belonging to a non-serving cell if the parameter $X_{CSIRS}$ used in sequence initialization to derive the CSI-RS sequence matches with the value (used in sequence initialization to derive the CRS) of a detected neighboring cell.

One example of an equation for calculating the CSI-RS sequence initialization equation is provided in equation 9 below:

$$c_{init}=2^{10} \cdot (7 \cdot (n_s^{CSIRS}+1)+l+1) \cdot (2 \cdot X_{CSIRS}+1)+2 \cdot X_{CSIRS}+ N_{CP} \quad (9)$$

One example of an equation for calculating the CRS sequence initialization equation is provided in equation 10 below:

$$c_{init}=2^{10} \cdot (7 \cdot (n_s^{CRS}+1)+l+1) \cdot (2 \cdot N_{ID}^{cell}+1)+2 \cdot N_{ID}^{cell}+ N_{CP} \quad (10)$$

Upon recognizing a CSI-RS port belonging to a neighboring cell, the UE may use the CRS of the neighboring cell to assist with time/frequency synchronization, provided that the quasi co-location assumption holds as described above. As a result, both CRS and CSI-RS information may be used for synchronization purposes. If the quasi co-location assumption does not hold, the UE may not use CRS of the neighboring cell to assist with time/frequency synchronization.

The UE has to always be able to receive signals from the serving cell where the timing is given by the PSS/SSS and the serving cell's CRS. Therefore, if configured by the network entity according to this embodiment to determine a new FFT timing for CoMP or if multiple CSI-RS resources are configured as described in U.S. patent application Ser. No. 13/626,572, the FFT timing is determined as the earliest signal arrival time of the serving cell's PSS/SSS/CRS and the new timing reference as described in this embodiment or in U.S. patent application Ser. No. 13/626,572.

However, for the purpose of uplink transmission and timing advance, the timing reference may need to be based on PSS/SSS/CRS. In one method, the timing reference is also modified accordingly for the uplink transmission and timing advance.

The above-described embodiments may be used to improve the channel estimation and/or time/frequency synchronization performance for PDSCH reception (based on DM-RS) or for CSI feedback (based on CSI-RS). In various embodiments, the UE may still receive the DL signals using a single FFT timing when configured to operate in CoMP. The following UE-specific signaling, which may be semi-static or dynamic, is proposed in order to assist the UE to determine the DL timing (i.e., FFT timing) for DL signal reception when configured to operate in CoMP so that the SNR of DL signals reception can be enhanced.

The network entity may provide network signaling (e.g. by RRC or MAC signaling) to indicate the adjustment of FFT timing that should be applied by the UE with respect to the FFT timing acquired from the serving cell (e.g., from PSS/SSS/CRS of the serving cell). For example, if the UE's nominal FFT timing (e.g., FFT timing derived from PSS/SSS/CRS of the serving cell) is t, the network signaling can indicate Δt, and the UE is recommended to consider the FFT timing of the UE to be t−Δt. Stricter conditions can also be applied such that the UE is required to modify the FFT timing to be t−Δt. More generally, the UE can take into account the network signaling of Δt in receiver operations, which could include one or more of timing estimation, channel estimation, decoding, and demodulation. For example, Δt may be defined as a worst case timing offset.

In many examples, Δt is a positive value, so that the timing adjustment involves advancing the FFT timing to recover potential earlier paths that may be missed by the UE as described above. However, a negative Δt value may be used in some embodiments. Optionally, the UE can perform further optimization of FFT timing adjustments in addition to the indicated timing, for example, t−Δt−δt, where δt is an additional adjustment deemed appropriate by the UE.

As discussed above, signaling can be provided by the network entity (e.g., via higher-layer signaling, such as RRC) to indicate to the UE the quasi co-location relationship between a DM-RS resource (e.g., identified as a set of DM-RS configurations, such as virtual cell ID and subframe offset etc. associated with a particular $n_{SCID}$ value) and a CSI-RS resource (e.g., identified by its resource ID or CSI process id). As one example, TABLE 10 illustrates quasi co-location association between DM-RS resources and CSI-RS resources where $X_{DMRS}(0)$ is considered the DMRS virtual cell ID indicated by $n_{SCID}=0$ and $X_{DMRS}(1)$ is considered the DMRS virtual cell ID indicated by $n_{SCID}=1$.

TABLE 10

| DM-RS Resource | CSI-RS resource considered quasi co-located with the DM-RS resource |
|---|---|
| DM RS resource 1 ($X_{DMRS}(0)$, . . . ) | CSI-RS resource 1 |
| DM RS resource 2 ($X_{DMRS}(1)$, . . . ) | CSI-RS resource 2 |

The number of DM-RS resources and the number of CSI-RS resources configured to the UE for L1 CSI feedback may be different. For example, the number of DM-RS resources configured may be 2, and the number of CSI-RS resources configured for CoMP measurement set may be 3. In this example, in a typical deployment scenario, each CSI-RS resource corresponds to a transmission point (TP) in a CoMP coordination area, and the Dynamic Point Selection (DPS) transmission scheme can involve all three TPs. In this case, one DM-RS resource can be quasi co-located with more than one CSI-RS resource but at different times (e.g., subframe), as illustrated, for example, as shown in TABLE 11 below and FIG. 7. TABLE 11 illustrates quasi co-location association between 2 DM-RS resources and 3 CSI-RS resources.

TABLE 11

| DM-RS Resource | CSI-RS resource considered quasi co-located with the DM-RS resource |
|---|---|
| DM RS resource 1 ($X_{DMRS}(0)$, . . . ) | CSI-RS resource 1 |
| DM RS resource 1 ($X_{DMRS}(0)$, . . . ) | CSI-RS resource 2 |
| DM RS resource 2 ($X_{DMRS}(1)$, . . . ) | CSI-RS resource 3 |

Figure 7:
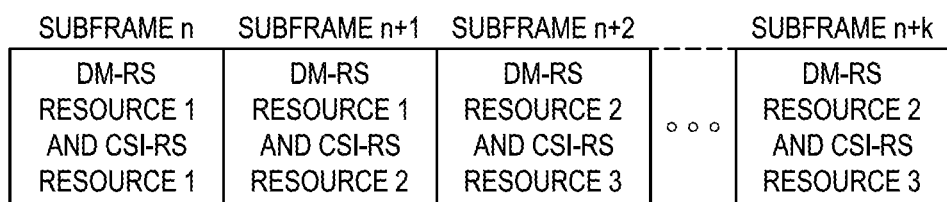
FIG. 7 illustrates an example of DM-RS resource and CSI-RS resource quasi co-location configurations changing over time in accordance with various embodiments of the present disclosure.

FIG. 7 illustrates an example of DM-RS resource and CSI-RS resource quasi co-location configuration changing over time in accordance with various embodiments of the present disclosure. In this illustrative example, a DM-RS resource 1 is quasi co-located CSI-RS resource 1 in subframe n but is quasi co-located with CSI-RS resource 2 in subframe n+1, whereas DM-RS resource 2 is quasi co-located with CSI-RS resource 3 in subframes n+2 to n+k. In this embodiment, an additional signaling mechanism may be required to indicate exactly which CSI-RS resource (e.g., CSI-RS resource 1 or 2) should be assumed quasi co-located with DM-RS resource 1 on a subframe basis. Additional bit(s) may be provisioned in the DCI format used for assigning the DL assignment with DM-RS to indicate information such as described above. For example, given the higher-layer signaling conveying the information in TABLE 11, one additional bit may be introduced in the DL assignment to indicate either CSI-RS resource 1 or 2 when DM-RS resource 1 is assigned. This information may be signaled without incurring additional signaling overhead in the DCI format. In one example, two parameters in the DCI format, namely the $n_{SCID}$ used for DM-RS sequence initialization (e.g., equation 11 below where $X_{DMRS}$ is the virtual cell ID indicated by $n_{SCID}$) and the NDI of the disabled transport block may be used to jointly indicate the quasi co-location assumption. The $n_{SCID}$ is assumed here to indicate the DM-RS resource. TABLE 12 below illustrates an example of the joint use of $n_{SCID}$ and NDI of a disabled transport block in the DCI format to indicate quasi co-location assumption. In this example, the interpretation of quasi co-location assumption is also dependent on the rank assigned (i.e., the number of layers). The reusing NDI of the disabled transport block is just one example. Other bit(s) in the DCI format can also be reused for this purpose if they serve no specific purpose in certain cases or if reusing them for this purpose does not cause negative effects to the purpose for which the bit(s) were originally intended. One example of an equation for calculating the DM-RS sequence initialization equation is provided in equation 11 below:

$$c_{init}=(\lfloor n_s^{DMRS}/2\rfloor+1)*(2\cdot X_{DMRS}+1)*2^{16}+n_{SCID} \tag{11}$$

TABLE 12

| Rank | $n_{SCID}$ value in the DCI format | NDI of disabled transport block in the DCI format | CSI-RS resource that is quasi co-located with the DM-RS assigned by the DCI format |
|---|---|---|---|
| 1 | $n_{SCID}=0$ | 0 | CSI-RS resource 1 |
| 1 | $n_{SCID}=0$ | 1 | CSI-RS resource 2 |
| 1 | $n_{SCID}=1$ | Don't care | CSI-RS resource 3 |
| 2 | $n_{SCID}=0$ | N/A | CSI-RS resource 1 |
| 2 | $n_{SCID}=1$ | N/A | CSI-RS resource 2 |
| >2 | $n_{SCID}=0$ (fixed) | N/A | CSI-RS resource 1 |

The UE may be configured by higher-layer signaling (e.g., RRC) on the semi-static quasi co-location relationship between DM-RS resources and CSI-RS resources, for example, as illustrated in TABLE 11 or described in further detail below. The UE detects the $n_{SCID}$ value in the DCI format to determine the quasi co-location assumption on subframe basis (e.g., as shown in TABLE 12 above).

Various embodiments provide linking of DM-RS resources and the CSI-RS resources. The RRC signaling structure may be signaled to indicate how the DM-RS resources and the CSI-RS resources are linked. The non-zero power CSI-RS resource may include, for example, and without limitation, CSI-RS configuration, subframe configuration, $P_c$, AntennaPortsCount, etc. In some embodiments, instead of associating $P_c$ with a CSI-RS resource, an alternative design is to associate $P_c$ with a CSI process.

In one example (i.e., Example 1), signaling provided by the network entity to indicate the UE the quasi co-location relationship between a DM-RS resource and a CSI-RS resource may have the following exemplary signaling structure:

```
CSI process config list {
    CSI process config x{
        CSI process id
        X_CSIRS (virtual cell ID for CSI-RS)
        Non-zero power CSI-RS resource config
        IMR config
        ...
    }
    ...
}
DM-RS config list{
    DM-RS config 1{
        X_DMRS(0) (virtual cell ID for DMRS resource y)
        ... (e.g. subframe offset)
```

List of CSI process IDs (this is the list of CSI-RS resources that can be quasi co-located with the DM-RS resource y), e.g. {CSI process ID 1, CSI process ID 2}

```
    }
    DM-RS config 2{
        X_DMRS(1) (virtual cell ID for DMRS resource y)
        ... (e.g. subframe offset)
        List of CSI process IDs (this is the list of CSI-RS
resources that can be quasi co-located with the DM-RS resource
y), e.g. {CSI process ID 3}
    }
}
```

In variation of the above example (i.e., Example 1a), the exemplary signaling structure may include:

```
CSI process config list {
    CSI process config x{
        CSI process ID
        CSI-RS resource ID
        IMR resource ID
        ...
    }
    ...
}
CSI-RS resource config list {
    CSI-RS resource config x {
        CSI-RS resource id
        CSI-RS virtual cell id
        Non zero-power CSI-RS resource config
        Non zero-power CSI-RS subframe config
        ...
    }
    ...
}
IMR resource config list {
    IMR resource config x {
        IMR resource ID
        IMR resource config
        IMR subframe config
        ...
    }
    ...
}
DM-RS config list{
    DM-RS config 1{
        X_DMRS(0) (virtual cell ID for DMRS resource y)
        ... (e.g. subframe offset)
A CSI-RS resource ID or a list of CSI-RS resource IDs (this is
the CSI-RS resource(s) that can be quasi co-located with the DM-
RS resource y), e.g. {CSI-RS resource ID 1} or {CSI-RS resource
ID 1, CSI-RS resource ID 2}
    }
        DM-RS config 2{
            X_DMRS(1) (virtual cell ID for DMRS resource y)
            ... (e.g. subframe offset)
            A CSI-RS resource ID or a list of CSI-RS
resource ids
    }
}
```

In variation of the above example (i.e., Example 1b), if a CSI-RS resource can be signaled by the network to be quasi co-located with a CRS of a cell, information about the quasi co-located CRS can be included in the CSI-RS resource configuration using the following exemplary signaling structure:

```
CSI process config list {
    CSI process config x{
        CSI process id
        CSI-RS resource id
        IMR resource id
        ...
    }
    ...
}
CSI-RS resource config list {
    CSI-RS resource config x {
        CSI-RS resource id
        Non zero-power CSI-RS resource config
        Non zero-power CSI-RS subframe config
        Indication that the CSI-RS resource is quasi co-located
with a CRS
        ...
    }
...
}
CSI-RS resource config list {
    CSI-RS resource config x {
        CSI-RS resource id
        Non zero-power CSI-RS resource config
        Non zero-power CSI-RS subframe config
        Indication that the CSI-RS resource is quasi co-located
with serving cell CRS
        ...
    }
...
}
CSI-RS resource config list {
    CSI-RS resource config x {
        CSI-RS resource id
        Non zero-power CSI-RS resource config
        Non zero-power CSI-RS subframe config
        Indication that the CSI-RS resource is quasi co-located
with a CRS
            CRS cell-ID (optional)
        ...
    }
...
}
IMR resource config list {
    IMR resource config x {
        IMR resource id
        IMR resource config
        IMR subframe config
        ...
    }
...
}
DM-RS config list{
    DM-RS config 1{
        X_DMRS(0) (virtual cell ID for DMRS resource y)
        ... (e.g. subframe offset)
A CSI-RS resource ID or a list of CSI-RS resource IDs (this is
the CSI-RS resource(s) that can be quasi co-located with the DM-
RS resource y), e.g. {CSI-RS resource ID 1} or {CSI-RS resource
ID 1, CSI-RS resource ID 2}
}
        DM-RS config 2{
```

-continued

```
        X_DMRS(1) (virtual cell ID for DMRS resource y)
        ... (e.g., subframe offset)
        A CSI-RS resource ID or a list of CSI-RS resource ids
    }
}
```

In variation of the above example (i.e., Example 1c), if a CSI-RS resource can be signaled by the network to be quasi co-located with a CRS of a cell, information about the quasi co-located CRS can be included in the CSI-RS resource configuration using the following exemplary signaling structure:

```
CSI process config list {
    CSI process config x{
        CSI process id
        CSI-RS resource id
        IMR resource id
        ...
    }
    ...
}
CSI-RS resource config list {
    CSI-RS resource config x {
        CSI-RS resource id
        Non zero-power CSI-RS resource config
        Non zero-power CSI-RS subframe config
        Cell ID of the quasi co-located CRS
        ...
    }
    ...
}
CSI-RS resource config list {
    CSI-RS resource config x {
        CSI-RS resource id
        Non zero-power CSI-RS resource config
        Non zero-power CSI-RS subframe config
        Indication that the CSI-RS resource is quasi co-located
with serving cell CRS
        ...
    }
    ...
}
IMR resource config list {
    IMR resource config x {
        IMR resource id
        IMR resource config
        IMR subframe config
        ...
    }
    ...
}
DM-RS config list{
    DM-RS config 1{
        X_DMRS(0) (virtual cell ID for DMRS resource y)
        ... (e.g. subframe offset)
A CSI-RS resource ID or a list of CSI-RS resource IDs (this is
the CSI-RS resource(s) that can be quasi co-located with the DM-
RS resource y), e.g. {CSI-RS resource ID 1} or {CSI-RS resource
ID1, CSI-RS resource ID 2}
    }
        DM-RS config 2{
            X_DMRS(1) (virtual cell ID for DMRS resource y)
            ... (e.g. subframe offset)
            A CSI-RS resource ID or a list of CSI-RS resource ids
    }
}
```

In a second example (i.e., Example 2), signaling provided by the network entity may allow implicit linking of CSI-RS resource parameter values and DM-RS resource parameter values using the following exemplary signaling structure:

```
CSI process config list {
    CSI process config x{
        CSI process id
        XCSIRS (virtual cell ID for CSI-RS)
        Non-zero power CSI-RS resource config
        IMR config
        ...
    }
}
DM-RS config list{
    DM-RS config 1 {
List of CSI process IDs (CSI process ID not only indicates quasi
co-location association, but also indicates the DM-RS resource
values, e.g. the virtual cell ID of DM-RS and the subframe
offset (e.g. virtual cell ID of DM-RS resource 1 is the same as
the virtual cell ID of the CSI-RS associated with the CSI
process id), similarly for subframe offset)
            e.g. {CSI process ID 1, CSI process ID 2}
    }
        DM-RS config 2 {
List of CSI process IDs (CSI process ID not only indicates quasi
co-location association, but also indicates the DM-RS resource
values, e.g. the virtual cell ID of DM-RS and the subframe
offset (e.g. virtual cell ID of DM-RS resource 2 is the same as
the virtual cell ID of the CSI-RS associated with the CSI
process ID), similarly for subframe offset)
            e.g. {CSI process ID 3}
    }
}
```

In variation of the above example (i.e., Example 2a), the exemplary signaling structure allowing implicit linking of CSI-RS resource parameter values and DM-RS resource parameter values may include:

```
CSI process config list {
    CSI process config x{
        CSI process id
        CSI-RS resource id
        IMR resource id
        ...
    }
}
CSI-RS resource config list {
    CSI-RS resource config x {
        CSI-RS resource id
        CSI-RS virtual cell id
        Non zero-power CSI-RS resource config
        Non zero-power CSI-RS subframe config
        ...
    }
...
}
IMR resource config list {
    IMR resource config x {
        IMR resource ID
        IMR resource config
        IMR subframe config
        ...
    }
...
}
DM-RS config list{
    DM-RS config 1 {
A CSI-RS resource ID or a list of CSI-RS resource IDs (CSI-RS
resource ID not only indicates quasi co-location association,
but also indicates the DM-RS resource values, e.g. the virtual
cell ID of DM-RS and the subframe offset (e.g. virtual cell ID
of DM-RS resource 1 is the same as the virtual cell ID of the
CSI-RS associated with the CSI-RS resource id), similarly for
subframe offset)
            e.g. {CSI-RS resource ID 1} or {CSI-RS resource ID 1,
CSI-RS resource ID 2}
    }
        DM-RS config 2 {
            A CSI-RS resource ID or a list of CSI resource IDs
    }
}
```

In various embodiments for EPDCCH DM-RS, an eNB configures a UE (e.g., by higher-layer signaling, such as RRC) of the quasi co-location relationship between the EPDCCH DMRS and a CSI-RS resource. The eNB may configure the quasi co-location relationship of the UE by configuring a CSI resource ID for the EPDCCH. In one example, for EPDCCH DM-RS, the eNB UE-specifically configures a virtual cell ID and a CSI resource ID. When a UE is configured with a virtual cell ID and a CSI resource ID, the UE uses the virtual cell ID for obtaining a scrambling sequence of the EPDCCH DMRS, and the UE assumes that the EPDCCH DMRS and CSI RS associated with the CSI resource ID is quasi co-located.

In another example, for EPDCCH DM-RS, the eNB specifically configures at least one pair of a virtual cell ID and a CSI resource ID. For example, a UE may be configured with two pairs of a virtual cell ID and a CSI resource ID. Then, the UE tries to blindly detect a DCI in the EPDCCH with two hypotheses, one with a first pair and the other with a second pair. When the UE blindly detects a DCI with the first pair of parameters, the UE utilizes the virtual cell ID of the first pair for obtaining the scrambling sequence of the EPDCCH DM-RS, and the UE assumes that the EPDCCH DM-RS and CSI RS associated with the CSI resource ID of the first pair is quasi co-located. Similarly, when the UE blindly detects a DCI with the second pair, the UE assumes that the EPDCCH DM-RS scrambled with the virtual cell ID of the second pair and CSI-RS associated with the CSI resource ID of the second pair are quasi co-located.

In another example, for EPDCCH DM-RS, the eNB specifically configures a CSI resource ID. When a UE is configured with a CSI resource ID, the UE derives a virtual cell ID for deriving the scrambling sequence of the EPDCCH DM-RS out of the CSI-RS configuration indicated by the CSI resource ID, and the UE assumes that the EPDCCH DM-RS and CSI RS associated with the CSI resource ID is quasi co-located. Here, the derived virtual cell ID can be the same as the virtual cell ID configured for CSI-RS associated with the CSI resource ID.

In one embodiment for EPDCCH DM-RS, two CSI resource IDs are separately configured, one for localized EPDCCH, and the other for distributed EPDCCH. This method could be useful in CoMP scenario 4, where localized EPDCCHs are transmitted from pico cells for area splitting, and distributed EPDCCHs are transmitted in an SFN manner. In one special case, the DM-RS for localized EPDCCH may be assumed quasi co-located with the DM-RS for the PDSCH in the same subframe. In this case, a common CSI resource ID may be used for both DM-RSs. In another embodiment for EPDCCH DM-RS, a common CSI resource ID is configured for a localized and distributed EPDCCH (e.g., for simplicity).

In another embodiment, a default quasi co-location relationship between EPDCCH DMRS and CRS is defined. In this case, unless there is an explicit configuration by the network, a UE may assume that EPDCCH DM-RS and CRS are quasi co-located. In another embodiment for DMRS of distributed EPDCCH, a UE may assume that CRS is quasi co-located with the EPDCCH. On the other hand, for DMRS of localized EPDCCH, the UE may assume that a CSI-RS is quasi co-located with the EPDCCH, where the CSI-RS is the one corresponding to a CSI resource ID configured for indicating the quasi co-location information between CSI-RS and localized EPDCCH. In another embodiment, the DMRS of EPDCCH can be flexibly mapped to any of CRS and/or CSI-RS (e.g., by configuring a CSI resource ID for the DMRS of EPDCCH). The CSI resource ID 0 can be used for CRS and positive-integer CSI resource IDs may be used for CSI-RS.

Figure 8:
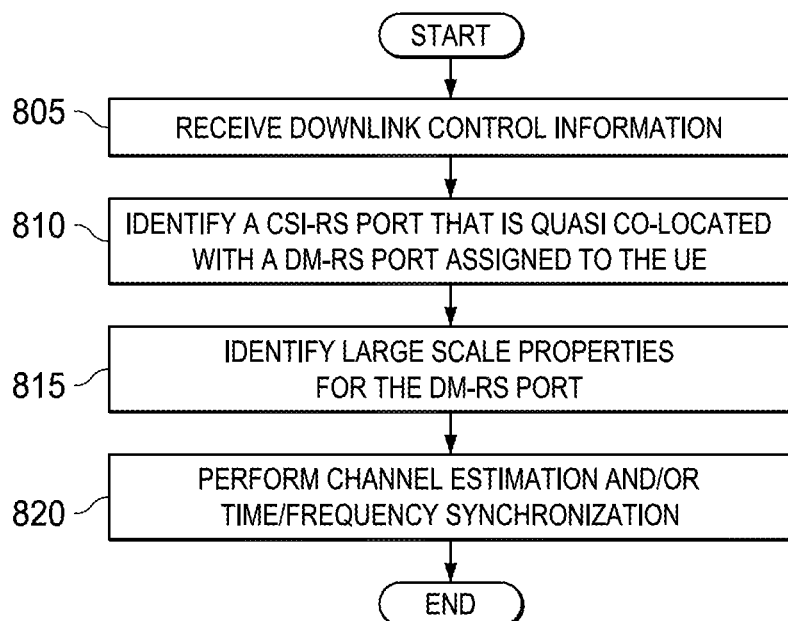
FIG. 8 illustrates a process for identifying quasi co-located reference signal ports by a UE in accordance with various embodiments of the present disclosure.

FIG. 8 illustrates a process for identifying quasi co-located reference signal ports by a UE in accordance with various embodiments of the present disclosure. For example, the process depicted in FIG. 8 may be performed by the receiver 410 in FIG. 4. The process may also be implemented by the UE 505 in FIG. 5.

The process starts with the UE receiving downlink control information (step 805). For example, in step 805, the downlink control information is higher-layer signaled (e.g., via RRC) or dynamically signaled (e.g., PDCCH or EPDCCH).

The UE then identifies a CSI-RS resource that is quasi co-located with a DM-RS port assigned to the UE (step 810). For example, in step 810, the UE may identify the CSI-RS port and/or DM-RS port assignments and then identify an indication of the quasi co-location assumption from the control information according to embodiments described above. Additionally, the UE may identify a CRS port(s) associated with the CSI-RS port(s) as quasi co-located with the assigned DM-RS port in response to identifying that the CSI-RS resource is quasi co-located with the assigned DM-RS resource.

The UE then identifies large scale properties for the DM-RS port (step 815). The CSI-RS port being quasi co-located with the assigned DM-RS port means that at least some of the large scale properties for the DM-RS port can be inferred from the large scale properties for the assigned CSI-RS port and vice versa. For example, in step 815, the UE may derive the large scale properties for the DM-RS port based on large scale properties for the assigned CSI-RS port. The derived large scale properties include, for example, and without limitation, one or more of a Doppler shift, a Doppler spread, an average delay, or a delay spread.

The UE then performs at least one of channel estimation, time synchronization, or frequency synchronization (step 820). For example, in step 820, the UE may perform the channel estimation using the identified large scale properties for the DM-RS and/or the CSI-RS port. The identified large scale properties may be used in addition to or in lieu of measured properties to improve the channel estimation. Additionally or alternatively, the UE may use the identified large scale properties for timing and/or frequency synchronization.

Figure 9:
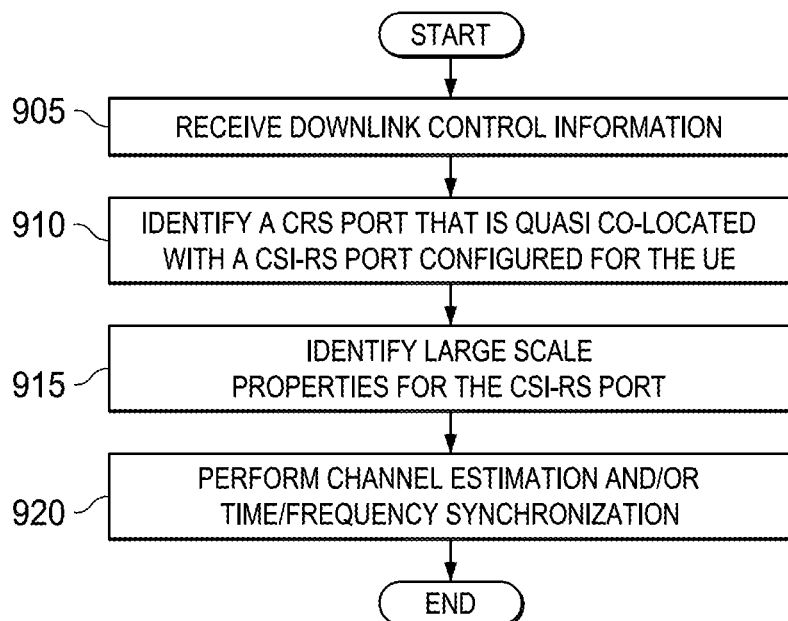
FIG. 9 illustrates another process for identifying quasi co-located reference signal ports by a UE in accordance with various embodiments of the present disclosure.

FIG. 9 illustrates another process for identifying quasi co-located reference signal ports by a UE in accordance with various embodiments of the present disclosure. For example, the process depicted in FIG. 9 may be performed by the receiver 410 in FIG. 4. The process may also be implemented by the UE 505 in FIG. 5.

The process begins with the UE receiving downlink control information (step 905). For example, in step 905, the downlink control information may be higher-layer signaled (e.g., via RRC).

The UE then identifies a CRS port that is quasi co-located with a CSI-RS port configured for the UE (step 910). For example, in step 910, the UE may identify the CSI-RS port and/or CRS port assignments and then identify an indication of the quasi co-location assumption from the control information according to embodiments described above. In one particular example, the UE may identify, from the downlink control information, a cell identifier associated with one or more CRS ports, one or more CSI-RS ports associated with a CSI-RS resource configured for the UE, and then determine that the one or more identified CRS ports are quasi co-located with the one or more identified CSI-RS ports associated with a CSI-RS resource configured for the UE.

The UE then identifies large scale properties for the CSI-RS port (step 915). The CRS port being quasi co-located with the configured CSI-RS port means that at least some of the large scale properties for the CSI-RS port can be inferred from the large scale properties for the CRS port and vice versa. For example, in step 915, the UE may derive the large scale properties for the CSI-RS port based on large scale properties for the configured CRS port and vice versa. The derived large scale properties include, for example, and without limitation, one or more of a Doppler shift, a Doppler spread, an average delay, or a delay spread.

The UE then performs at least one of channel estimation, time synchronization, or frequency synchronization (step 920). For example, in step 920, the UE may perform the channel estimation using the identified large scale properties for the CRS port and or the CSI-RS port. The identified large scale properties may be used in addition to or in lieu of measured properties to improve the channel estimation. Additionally or alternatively, the UE may use the identified large scale properties for timing and/or frequency synchronization.

Although FIGS. 8 and 9 illustrate examples of processes for identifying quasi co-located reference signal ports by a UE, various changes could be made to FIGS. 8 and 9. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for communication in a communication system, comprising:
a transceiver configured to transmit or receive a signal; and
a controller configured to:
identify information for a channel state information reference signal (CSI-RS) resource of at least one CSI-RS, information for quasi co-location of the at least one CSI-RS, and cell information for the at least one CSI-RS,
acquire downlink control information for scheduling of a downlink data channel, the downlink control information including information for quasi co-location, the information for quasi co-location being associated with the at least one CSI-RS, and
acquire the downlink data channel scheduled by the downlink control information based on at least one demodulation reference signal (DMRS) port of the downlink data channel and the at least one CSI-RS,
wherein the at least one DMRS port of the downlink data channel is quasi co-located with the at least one CSI-RS in properties for at least one of a Doppler shift, a Doppler spread, an average delay, and a delay spread.

2. The apparatus of claim 1, wherein the at least one CSI-RS is a non-zero power CSI-RS.

3. The apparatus of claim 1, wherein the information for the CSI-RS resource of at least one CSI-RS, the information for quasi co-location of the at least one CSI-RS, and the cell information for the at least one CSI-RS are received through radio resource control (RRC) signaling.

4. The apparatus of claim 1, wherein the information for CSI-RS quasi co-location corresponds to one of the information for CSI-RS resource of the at least one CSI-RS.

5. The apparatus of claim 1, wherein the downlink control information for scheduling of the downlink data channel further comprises of information for the at least one DMRS port of the downlink data channel.

6. An apparatus for communication in a communication system, comprising:
a controller; and
a transceiver configured to:
transmit first information indicating at least two reference signal (RS) resources for at least two RSs, second information for quasi co-location relationships between RSs associated with the at least two RS resources and demodulation reference signal (DMRS) ports, and third information indicating a cell index to which a RS resource is applied,
transmit downlink control information for scheduling of a downlink data channel, the downlink control information including information indicating which RS resource from among the at least two RS resources indicated by the first information is quasi co-located with DMRS ports related to the downlink data channel, and
transmit the downlink data channel scheduled by the downlink control information, based on the first information, the second information, and the third information,
wherein at least one DMRS port of the downlink data channel assigned to a user equipment (UE) is quasi co-located with a port for at least one channel state information reference signal (CSI-RS) in the RS resource indicated the downlink control information, and wherein large scale properties for the at least one DMRS port are identified from large scale properties for the at least one CSI-RS port.

7. The apparatus of claim 6, wherein the large scale properties include at least one of a Doppler shift, a Doppler spread, an average delay, and a delay spread.

8. The apparatus of claim 6, wherein the at least one DMRS port and the at least one CSI-RS port are quasi co-located if fourth information is received.

9. A method for communication in a communication system, comprising:
identifying information for a channel state information reference signal (CSI-RS) resource of at least one CSI-RS, information for quasi co-location of the at least one CSI-RS, and cell information for the at least one CSI-RS;
acquiring downlink control information for scheduling of a downlink data channel, the downlink control information including information for quasi co-location, the information for quasi co-location being associated with the at least one CSI-RS; and
acquiring a downlink data channel scheduled by the downlink control information, based on at least one demodulation reference signal (DMRS) port of the downlink data channel and the at least one CSI-RS,
wherein the at least one DMRS port of the downlink data channel is quasi co-located with the at least one CSI-RS in properties for at least one of a Doppler shift, a Doppler spread, an average delay, and a delay spread.

10. The method of claim 9, wherein the at least one CSI-RS is non-zero power CSI-RS.

11. The method of claim 9, wherein the information for CSI-RS resource of at least one CSI-RS, the information for quasi co-location of the at least one CSI-RS, and the cell information for the at least one CSI-RS are received through radio resource control (RRC) signaling.

12. The method of claim 9, wherein the information for CSI-RS quasi co-location corresponds to one of the information for CSI-RS resource of the at least one CSI-RS.

13. The method of claim 9, wherein the downlink control information for scheduling of the downlink data channel further comprises of information for the at least one DMRS port of the downlink data channel.

14. A method for communication in a communication system, the method comprising:
   transmitting first information indicating at least two reference signal (RS) resources for at least two RSs, second information for providing quasi co-location relationships between RSs associated with the at least two RS resources and demodulation reference signal (DMRS) ports, and third information indicating a cell index to which a RS resource is applied;
   transmitting downlink control information for scheduling of a downlink data channel, the downlink control information including information indicating which RS resource from among the at least two RS resources indicated by the first information is quasi co-located with DMRS ports related to the downlink data channel; and
   transmitting the downlink data channel scheduled by the downlink control information, based on the first information, the second information, and the third information,
   wherein at least one DMRS port of the downlink data channel assigned to a user equipment (UE) is quasi co-located with a port for at least one channel state information reference signal (CSI-RS) in the RS resource indicated the downlink control information, and wherein large scale properties for the at least one DMRS port are identified from large scale properties for the at least one CSI-RS port.

15. The method of claim 14, wherein the large scale properties include at least one of a Doppler shift, a Doppler spread, an average delay, and a delay spread.

16. The method of claim 14, wherein the at least one DMRS port and the at least one CSI-RS port are quasi co-located if fourth information is received.

* * * * *